(12) United States Patent
Mathew et al.

(10) Patent No.: US 9,015,123 B1
(45) Date of Patent: Apr. 21, 2015

(54) METHODS AND SYSTEMS FOR IDENTIFYING CHANGED DATA IN AN EXPANDABLE STORAGE VOLUME

(71) Applicant: NetApp, Inc., Sunnyvale, CA (US)

(72) Inventors: Jose Mathew, Santa Clara, CA (US); Rithin Shetty, Sunnyvale, CA (US); Kiran Kumar Modukuri, Livermore, CA (US); Aditya Toomula, Milpitas, CA (US); Anudhar Emani, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 124 days.

(21) Appl. No.: 13/743,222

(22) Filed: Jan. 16, 2013

(51) Int. Cl.
  *G06F 7/00* (2006.01)
  *G06F 17/00* (2006.01)
  *G06F 17/30* (2006.01)

(52) U.S. Cl.
  CPC .................................. *G06F 17/30174* (2013.01)

(58) Field of Classification Search
  CPC ............ G06F 11/1451; G06F 11/1458; G06F 11/1464; G06F 11/1469; G06F 2201/84
  See application file for complete search history.

(56) References Cited

U.S. PATENT DOCUMENTS

| | | | |
|---|---|---|---|
| 7,111,014 B2 | 9/2006 | Sawdon et al. | |
| 7,403,960 B2 | 7/2008 | Kodama | |
| 7,502,801 B2 | 3/2009 | Sawdon et al. | |
| 7,562,077 B2 | 7/2009 | Bisson et al. | |
| 7,617,370 B2 | 11/2009 | Jernigan, IV et al. | |
| 7,624,106 B1 | 11/2009 | Manley et al. | |
| 7,644,109 B2 * | 1/2010 | Manley et al. | 707/999.203 |
| 7,647,451 B1 * | 1/2010 | Corbett et al. | 711/114 |
| 7,693,864 B1 * | 4/2010 | Pasupathy et al. | 707/999.102 |
| 7,814,058 B2 * | 10/2010 | Beck | 707/649 |
| 7,818,299 B1 * | 10/2010 | Federwisch et al. | 707/649 |
| 7,873,619 B1 * | 1/2011 | Faibish et al. | 707/705 |
| 7,904,466 B1 | 3/2011 | Valencia et al. | |
| 7,958,168 B2 * | 6/2011 | Chen et al. | 707/822 |
| 7,958,169 B1 * | 6/2011 | Witte et al. | 707/825 |
| 8,001,090 B2 * | 8/2011 | Rajan | 707/674 |
| 8,069,149 B1 * | 11/2011 | Chen et al. | 707/649 |
| 8,117,166 B2 * | 2/2012 | Kodama | 707/640 |
| 8,176,018 B1 * | 5/2012 | Bisson et al. | 707/690 |
| 8,185,497 B2 * | 5/2012 | Vermeulen et al. | 707/626 |
| 2002/0116395 A1 | 8/2002 | Christensen | |
| 2002/0156840 A1 | 10/2002 | Ulrich et al. | |
| 2003/0050915 A1 | 3/2003 | Allemang et al. | |
| 2003/0158861 A1 * | 8/2003 | Sawdon et al. | 707/200 |
| 2003/0182301 A1 | 9/2003 | Patterson et al. | |
| 2003/0182322 A1 | 9/2003 | Manley et al. | |
| 2004/0030668 A1 | 2/2004 | Pawlowski et al. | |
| 2004/0107314 A1 * | 6/2004 | Kim et al. | 711/114 |

(Continued)

*Primary Examiner* — Robert Beausoliel, Jr.
*Assistant Examiner* — Nicholas Allen
(74) *Attorney, Agent, or Firm* — Perkins Coie LLP

(57) ABSTRACT

An embodiment of the invention provides an apparatus and method for presenting differences in a file system of a clustered storage system. In an embodiment, the clustered storage system receives a request from a host, where the request is for a listing of changes in the file system within a time interval. A comparison unit in each storage node of the clustered storage system determines each metadata container associated with the file system which has changed within the time interval. The application programming interface buffers at least one identifier that corresponds to a metadata container associated with the file system which has changed within the time interval. The application programming interface packages and transmits the at least one identifier to the host. The at least one identifier is readable on the host.

30 Claims, 18 Drawing Sheets

(56) References Cited

U.S. PATENT DOCUMENTS

| | | |
|---|---|---|
| 2005/0004954 A1 | 1/2005 | Soule |
| 2005/0033748 A1* | 2/2005 | Kazar et al. ............... 707/10 |
| 2005/0033777 A1* | 2/2005 | Moraes et al. ............. 707/202 |
| 2005/0246382 A1 | 11/2005 | Edwards |
| 2006/0004725 A1 | 1/2006 | Abraido-Fandino |
| 2006/0053139 A1* | 3/2006 | Marzinski et al. ........... 707/101 |
| 2006/0112151 A1* | 5/2006 | Manley et al. .............. 707/201 |
| 2006/0218135 A1 | 9/2006 | Bisson et al. |
| 2006/0242179 A1 | 10/2006 | Chen et al. |
| 2006/0248273 A1 | 11/2006 | Jernigan et al. |
| 2006/0248378 A1 | 11/2006 | Grcanac et al. |
| 2006/0288026 A1 | 12/2006 | Zayas et al. |
| 2007/0038697 A1* | 2/2007 | Zimran et al. .............. 709/203 |
| 2007/0067256 A1 | 3/2007 | Zayas et al. |
| 2007/0183224 A1 | 8/2007 | Erofeev |
| 2007/0186068 A1 | 8/2007 | Agrawal |
| 2008/0288564 A1* | 11/2008 | Kodama ..................... 707/205 |
| 2010/0114889 A1* | 5/2010 | Rabii et al. ................. 707/737 |
| 2010/0153617 A1* | 6/2010 | Miroshnichenko et al. ...... 711/6 |
| 2010/0198795 A1* | 8/2010 | Chen et al. ................. 707/674 |
| 2010/0333116 A1* | 12/2010 | Prahlad et al. .............. 719/328 |
| 2011/0082836 A1* | 4/2011 | Wang et al. ................. 707/649 |
| 2011/0087635 A1* | 4/2011 | Fachan et al. ............... 707/649 |
| 2011/0138366 A1* | 6/2011 | Wintergerst et al. .......... 717/130 |
| 2011/0313973 A1* | 12/2011 | Srivas et al. ................ 707/634 |
| 2012/0011176 A1* | 1/2012 | Aizman ...................... 707/822 |
| 2012/0089569 A1* | 4/2012 | Mason et al. ................ 707/639 |
| 2012/0101991 A1* | 4/2012 | Srivas et al. ................ 707/623 |
| 2012/0150807 A1* | 6/2012 | Eng et al. ................... 707/649 |
| 2012/0179886 A1* | 7/2012 | Prahlad et al. .............. 711/162 |
| 2012/0191654 A1* | 7/2012 | Beck ......................... 707/639 |
| 2012/0226712 A1* | 9/2012 | Vermeulen et al. ........... 707/770 |
| 2012/0254123 A1* | 10/2012 | Ferguson et al. ............. 707/649 |
| 2012/0259810 A1* | 10/2012 | Kopylovitz et al. ........... 707/609 |
| 2012/0303585 A1* | 11/2012 | Zuckerman et al. ........... 707/649 |
| 2012/0323859 A1* | 12/2012 | Yasa et al. .................. 707/692 |
| 2012/0330954 A1* | 12/2012 | Sivasubramanian et al. . 707/737 |
| 2013/0006939 A1* | 1/2013 | Hinrichs, Jr. ................ 707/639 |
| 2013/0006942 A1* | 1/2013 | Prahlad et al. .............. 707/649 |

* cited by examiner

| Inode # | File/Directory Name |
|---|---|
| 1 | root |
| 4 | bin |
| 7 | dev |
| 14 | lib |
| 9 | etc |
| 6 | usr |
| 8 | tmp |
| 15 | dev1 |
| 26 | bob |
| 17 | jeff |
| 12 | grants |
| 81 | books |
| 60 | mbox |
| 14 | sue |
| 51 | sam |
| 29 | kiran |
| 17 | linux |
| 84 | music |

| Inode # | File/Directory Name |
|---|---|
| 1 | root |
| 4 | dev |
| 5 | bin |
| 3 | etc |
| 8 | sys |
| 25 | vol 1 |
| 7 | 60 |
| 22 | vol 2 |
| 24 | vol 3 |
| 11 | 15 |
| 14 | 12 |
| 17 | 81 |
| 19 | 84 |
| 13 | 17 |

METHODS AND SYSTEMS FOR IDENTIFYING CHANGED DATA IN AN EXPANDABLE STORAGE VOLUME

TECHNICAL FIELD

At least one embodiment of the present invention pertains to data storage systems, and more particularly, to methods and systems for presenting differences in a file system.

BACKGROUND

In storage technology, a storage server is a class of computer that provides services relating to the organization and storage of information or data on storage devices such as disk drives ("disks"). In other words, a storage server is adapted to store and retrieve data on behalf of one or more client processing systems ("clients" or "hosts") in response to external requests received from the hosts. A storage server can provide clients with file-level access to data stored in the storage devices. A storage server can also provide clients with block-level access to stored data, or with both file-level access and block-level access. For convenience, a storage server will be described herein, for the most part, in terms of storage devices that provide file-level access, though the description herein will also have application to storage devices that provide block-level access, as will be apparent to those of ordinary skill in the art in light of the description that follows. Examples of such storage servers include a file server or another type of computing device that provides storage services using a file system to respond to file-oriented data access requests ("filer"). A storage server includes a storage operating system that implements a file system to logically organize the information as a hierarchical structure of directories and files on the disks. Each file stored on a disk or other type of storage device may be implemented as a set of data structures, e.g., disk blocks, which are configured to store information.

A disk-based storage for a storage server typically has one or more storage "volumes" which are a collection of physical storage disks and which define an overall logical arrangement of storage space. In other words, a storage volume is a logical container that includes a collection of disks. Therefore, the collection of disks is grouped (assimilated) into the storage volume. Each storage volume is generally associated with its own file system.

A software application can seek access to a file system in order to determine the changes that have occurred for files or directories in the file system. In one instance, such determined changes of the file system could be utilized by the software application to create a backup of a storage server the file system is associated with. However, current methods for discovering the changes in a file system would require the software application to traverse through each directory and through each branch from a directory in a file system (a process known as a "tree walk", since the file system is typically tree-structured), and to examine each file in each directory to determine which files have been modified, added, or accessed. The software application (which is external to a storage server that stores a file system) is required to perform multiple reads to the file system by use of the tree-walk process across the directories in the file system, store the results of the multiple reads to the file system, and then determine the changes in the file system based on the results of these multiple reads. Such a process creates a huge latency. The tree-walk process is further inefficient because of additional latency when data read from the directories have been stored on disk in a non-sequential and random placement. Such non-sequential and random placement of data results in a longer time to access the data.

Accordingly, the current technology is limited in its capabilities and suffers from at least the above constraints and deficiencies.

SUMMARY

The technique introduced here provides an apparatus and method for identifying and/or presenting differences in a file system of a clustered storage system. The file system maintains a hierarchical representation of the logical containers of data (e.g., files and directories stored in the clustered storage system. A clustered storage system includes multiple networked storage nodes to store the files and directories. In one embodiment of the clustered storage system, one of the storage nodes is used as a "namespace" storage node interconnected, while the remaining storage nodes are used as data storage nodes. In some instances, the namespace storage node is used to maintain the file system of the clustered storage system. The data storage nodes are used to store the data associated with each of the files and directories present in the file system of the clustered storage system. This separation (i.e., the separation of the file system of the clustered storage system from the data associated with the files and directories of the file system) results in any content modification to the data of the files and directories stored in the data storage nodes to happen independent of the file system of the clustered storage system. Further, in some embodiments, each data storage node maintains a local file system, independent of the file system of the clustered storage system, to organize and maintain the data of the files and directories present in the file system of the clustered storage system.

In an illustrative embodiment of the technique introduced here, an application programming interface (associated with, for example, the namespace storage node) in the clustered storage system receives a request (e.g., via a network) from a host to list the changes in the file system of the clustered storage system within a time interval. The application programming interface forwards the request to a comparison unit in each of the storage nodes. The comparison units determine the changes to the file system within the time interval. Here, the comparison unit in the namespace storage node identifies each metadata container (e.g., Inode) that has changed (i.e. added, deleted, renamed, or moved) in the file system of the clustered storage system within the time interval.

Similarly, comparison units in each of the data storage nodes identify each metadata container (e.g., Inode) that has been modified in the time interval, as indicated by their respective local file systems. Given that the modified metadata containers in the data storage nodes correspond to modified data of files or directories in the file system of the clustered storage system, the application programming interface utilizes the file system of the clustered storage system (i.e., the file system stored in the namespace storage node) to identify and buffer at least one identifier for each modified metadata container. The application programming interface packages and transmits the identifiers to the host, where the identifiers serve as indicators of the changes to the file system of the clustered storage system.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable medium including, but not limited to, an application specific integrated circuit (ASIC), compact disc (CD), digital video disk (DVD), read only memory (ROM), floppy disk, hard disk, electrically erasable programmable read only memory (EEPROM), memory stick, flash memory device or any other non-volatile memory device, or any other storage device, in accordance with the claimed subject matter.

Figure 1:
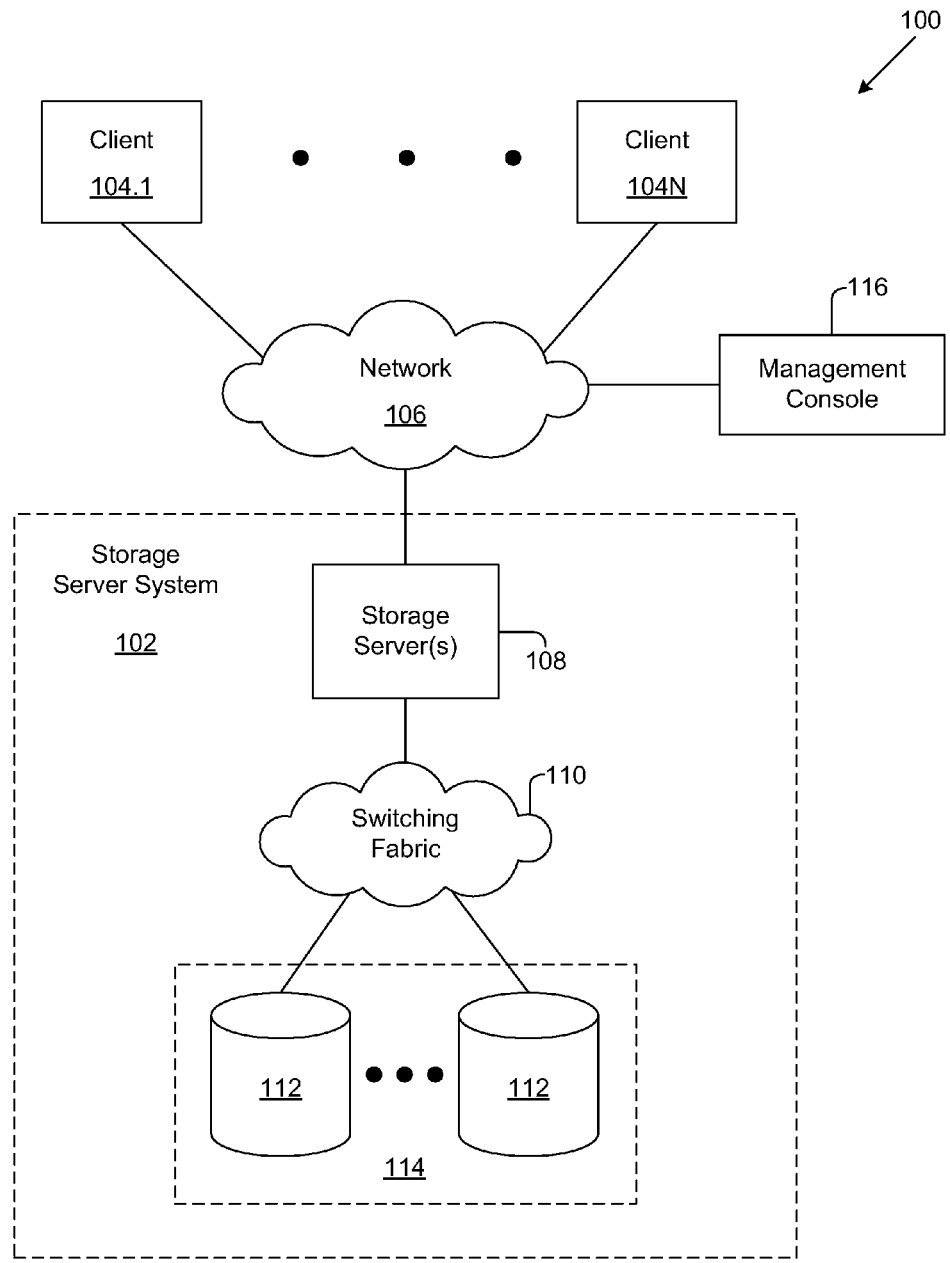
FIG. 1 illustrates a network storage environment, in which the techniques introduced here can be implemented.
Figure 2:
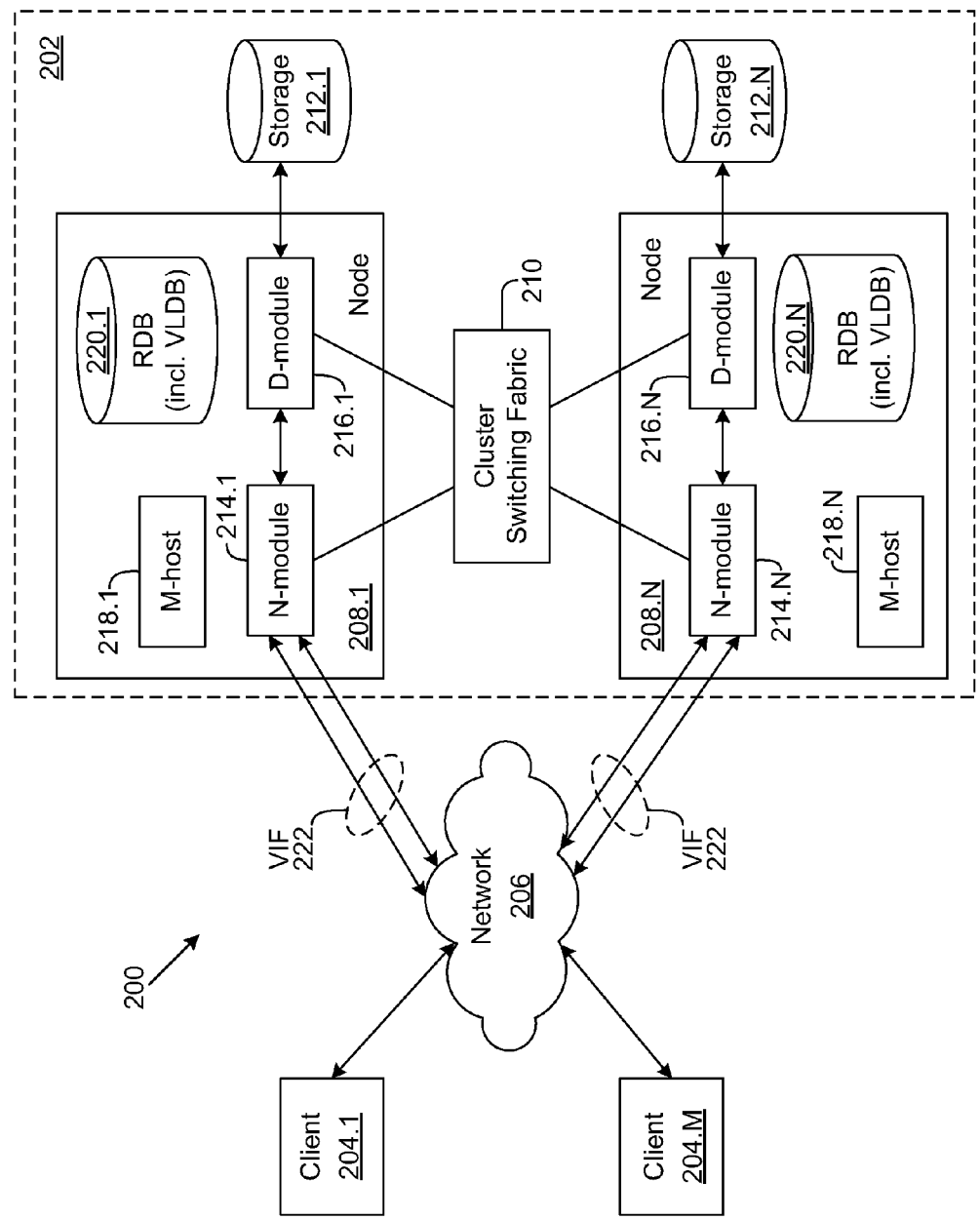
FIG. 2 illustrates a clustered network storage environment in which the techniques introduced here can be implemented.

System Environment:

FIGS. 1 and 2 show, at different levels of detail, storage environment configurations in which the techniques introduced here can be implemented. Clients are presented with a clustered storage system (may also be referred to as an expandable storage volume) having a plurality of storage volumes that can be managed by a plurality of nodes. The expandable storage volume is replicated, for example, by taking snapshots of each storage volume at a primary location. The techniques described below in detail provide a disaster recovery solution based on which the snapshots at the primary location are copied to a remote location. The remote location can be used if the primary location becomes unavailable for any reason. The snapshots at the remote location can be presented to clients as a single logical object and clients are able to access snapshots of various volumes using the single logical object, as described below in detail.

Referring to FIG. 1, a network data storage environment 100 is shown. The storage environment 100 includes a plurality of client systems 104.1-104.N, a storage server system 102, and a network 106 connecting the client systems 104.1-104.N and the storage server system 102. As shown in FIG. 1, the storage server system 102 includes at least one storage server 108, a switching fabric 110, and a number of mass storage devices 112 within a mass storage subsystem 114, such as conventional magnetic disks, optical disks such as CD-ROM or DVD based storage, magneto-optical (MO) storage, flash memory storage device or any other type of non-volatile storage devices suitable for storing structured or unstructured data. The examples disclosed herein may reference a storage device as a "disk" but the adaptive embodiments disclosed herein are not limited to disks or any particular type of storage media/device, in the mass storage subsystem 114.

The storage server (or servers) 108 may be, for example, one of the storage server products available from NetApp, Inc., the assignee of the present application. The client systems 104.1-104.N may access the storage server 108 via network 106, which can be a packet-switched network, for example, a local area network (LAN), wide area network (WAN) or any other type of network.

The storage server 108 maybe connected to the storage devices 112 via the switching fabric 110, which can be a fiber distributed data interface (FDDI) network, for example. It is noted that, within the network data storage environment, any other suitable numbers of storage servers and/or mass storage devices, and/or any other suitable network technologies, may be employed. While FIG. 1 implies, in some embodiments, a fully connected switching fabric 110 where storage servers can see all storage devices, it is understood that such a connected topology is not required. In some embodiments, the storage devices can be directly connected to the storage servers such that no two storage servers see a given storage device.

The storage server 108 can make some or all of the storage space on the storage devices 112 available to the client systems 104.1-104.N in a conventional manner. For example, each storage device 112 can be implemented as an individual disk, multiple disks (e.g., a RAID group) or any other suitable mass storage device(s). The storage server 108 can communicate with the client systems 104.1-104.N according to well-known protocols, such as the Network File System (NFS) protocol or the Common Internet File System (CIFS) protocol, to make data stored at storage devices 112 available to users and/or application programs.

The storage server 108 can present or export data stored at storage device 112 as volumes (also referred to herein as storage volumes) to each of the client systems 104.1-104.N. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical unit numbers (LUNs), directories, files). Note that a "file system" does not have to include or be based on "files" per se as its units of data storage.

Various functions and configuration settings of the storage server 108 and the mass storage subsystem 114 can be controlled from a management console 116 coupled to the network 106.

FIG. 2 depicts a cluster based storage environment 200 having a plurality of server nodes, according to one embodiment. In the cluster based storage environment 200, clients may be presented with an expandable storage volume (for example, an Infinite volume 600 described below with respect to FIG. 6A) having a plurality of storage volumes that are managed by different server nodes. The various storage volumes are replicated using the techniques described below in detail.

The storage environment 200 includes a plurality of client systems 204 (204.1-204.M), a clustered storage system 202, and a network 206 connecting the client systems 204 and the clustered storage server system 202. As shown in FIG. 2, the clustered storage server system 202 includes a plurality of server nodes (may also be referred to as "nodes") 208.1-208.N (208), a cluster switching fabric 210, and a plurality of mass storage devices 212 (212.1-212.N), similar to storage devices 112 (FIG. 1). Note that more than one mass storage device 212 can be associated with each node 208.

Each of the nodes 208 is configured to include several modules, including an N-module 214, a D-module 216, and an M-host 218 (each of which can be implemented by using a separate processor executable module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.N include functionality that enables nodes 208.1-208.N, respectively, to connect to one or more of the client systems 204 over the network 206, while the D-modules 216.1-216.N provide access to the data stored at storage devices 212.1-212.N, respectively. The M-hosts 218 provide management functions for the clustered storage server system 202 including a system for replicating the Infinite Volume 600 described below in detail. Accordingly, each of the server nodes 208 in the clustered storage server arrangement provides the functionality of a storage server.

In one embodiment RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage for information used by nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

A switched virtualization layer including a plurality of virtual interfaces (VIFs) 222 is provided between the respective N-modules 214.1-214.N and the client systems 204.1-204.M, allowing the storage 212.1-212.N associated with the nodes 208.1-208.N to be presented to the client systems as a single shared storage pool.

The clustered storage system 202 can be organized into any suitable number of virtual servers (also referred to as "vservers"), in which each vserver represents a single storage system namespace with separate network access. Each vserver has a user domain and a security domain that are separate from the user and security domains of other vservers. Moreover, each vserver is associated with one or more VIFs 222 and can span one or more physical nodes, each of which can hold one or more VIFs 222 and storage associated with one or more vservers. Client systems can access the data on a vserver from any node of the clustered system, but only through the VIFs 222 associated with that vserver. It is noteworthy that the embodiments described herein are not limited to the use of vservers.

The nodes 208 are interconnected by a cluster switching fabric 210, which can be embodied as a Gigabit Ethernet switch, for example. The N-modules 214 and D-modules 216 cooperate to provide highly-scalable, distributed storage system architecture of a clustered computing environment implementing exemplary embodiments of the technique introduced here. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
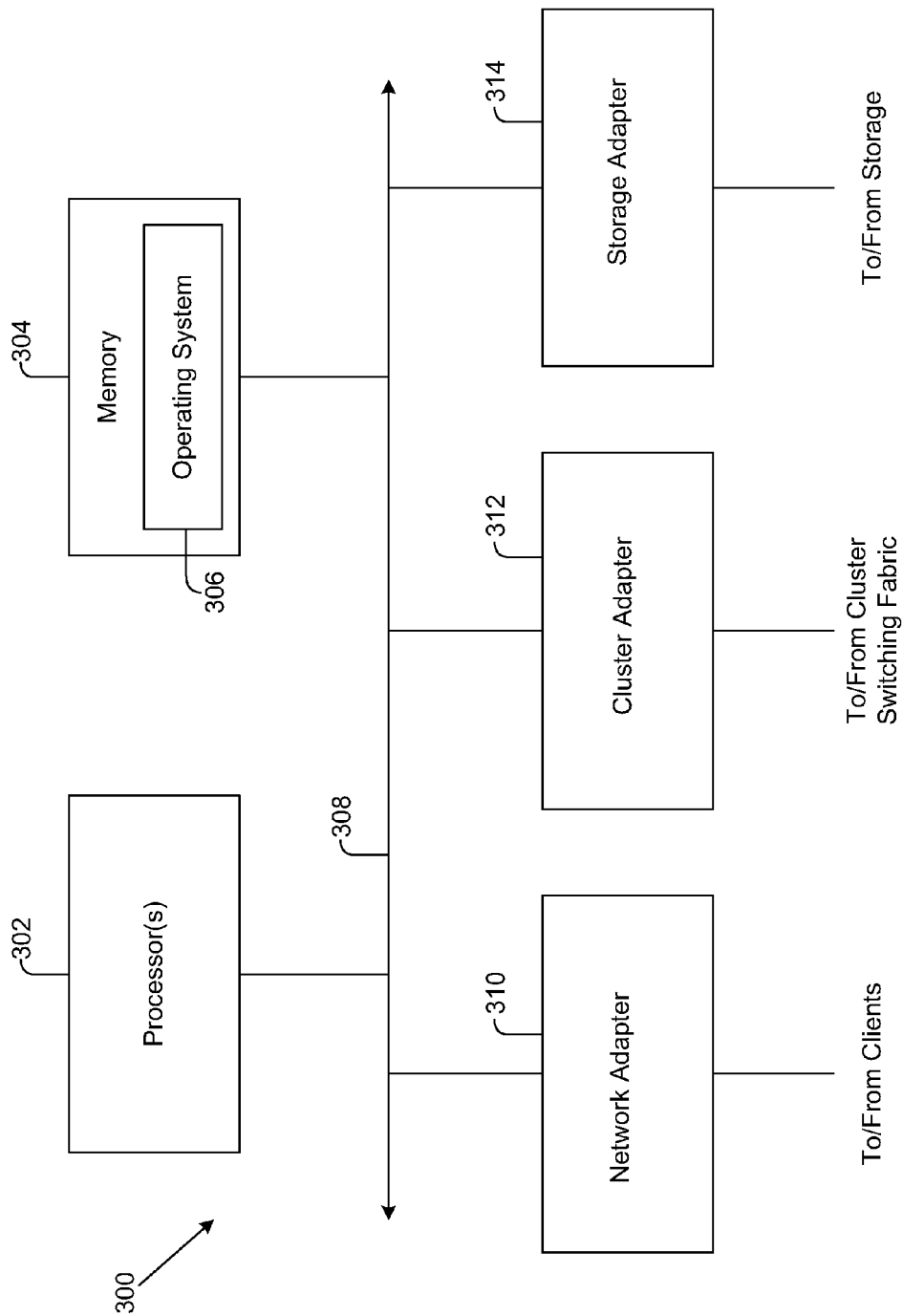
FIG. 3 is a high-level block diagram showing an example of the hardware architecture of a storage controller that can implement one or more storage server nodes.

FIG. 3 is a diagram illustrating an example for implementing one or more of the storage server nodes 208 as a storage controller 300. The storage controller 300 executes some or all of the processor executable process steps that are described below in detail. In one embodiment, the storage controller 300 includes a processor subsystem that includes one or more processors 302. Processor 302 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The storage controller 300 further includes a memory 304, a network adapter 310, a cluster access adapter 312 and a storage adapter 314, all interconnected by an interconnect 308. Interconnect 308 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other system.

The cluster access adapter 312 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 312 is utilized by the N-module 214 and/or D-module 216 for communicating with other N-modules and/or D-modules of the cluster.

The storage controller 300 can be embodied as a single- or multi-processor storage system executing a storage operating system 306 that preferably implements a high-level module, such as a storage manager, to logically organize the information as a hierarchical structure of named directories, files and special types of files called virtual disks (hereinafter generally "blocks") at the storage devices. Illustratively, one processor 302 can execute the functions of the N-module 214 on the node 208 while another processor 302 executes the functions of the D-module 216.

The memory 304 illustratively comprises storage locations that are addressable by the processors and adapters 310, 312, 314 for storing processor executable code and data structures associated with the present disclosure. The processor 302 and adapters may, in turn, comprise processing elements and/or logic circuitry configured to execute the software code and manipulate the data structures. The storage operating system 306, portions of which is typically resident in memory and executed by the processors(s) 302, functionally organizes the storage controller 300 by (among other things) configuring the processor(s) 302 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 310 includes a plurality of ports to couple the storage controller 300 to one or more clients 204 over point-to-point links, wide area networks, virtual private networks implemented over a public network (Internet) or a shared local area network. The network adapter 310 thus can include the mechanical, electrical and signaling circuitry needed to connect the storage controller 300 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 314 cooperates with the storage operating system 306 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on storage devices 212. The storage adapter 314 includes a plurality of ports having input/output (I/O) interface circuitry that couples to the disks over an I/O interconnect arrangement, such as a conventional high-performance, Fibre Channel (FC) link topology.

Storage of information on storage devices 212 can be implemented as one or more storage volumes that include a collection of physical storage disks cooperating to define an overall logical arrangement of volume block number (VBN) space on the volume(s). The storage devices 212 can be organized as a RAID group. One or more RAID groups together form an aggregate. An aggregate can contain one or more volumes/file systems.

The storage operating system 306 facilitates clients' access to data stored on the storage devices 212. In certain embodiments, the storage operating system 306 implements a write-anywhere file system that cooperates with one or more virtualization modules to "virtualize" the storage space provided by storage devices 212. In certain embodiments, a storage manager 406 (FIG. 4) logically organizes the information as a hierarchical structure of named directories and files on the storage devices 212. Each "on-disk" file may be implemented as set of disk blocks configured to store information, such as data, whereas the directory may be implemented as a specially formatted file in which names and links to other files and directories are stored. The virtualization module(s) allow the storage manager 406 to further logically organize information as a hierarchical structure of blocks on the disks that are exported as named logical unit numbers (LUNs).

In the illustrative embodiment, the storage operating system 306 is a version of the Data ONTAP® operating system available from NetApp, Inc. and the storage manager 406 implements the Write Anywhere File Layout (WAFL®) file system. Additional details of an example storage operating system 306 are disclosed in, for example, commonly-assigned U.S. patent application Ser. No. 10/836,090. However, other storage operating systems are capable of being enhanced or created for use in accordance with the principles described herein.

Figure 4:
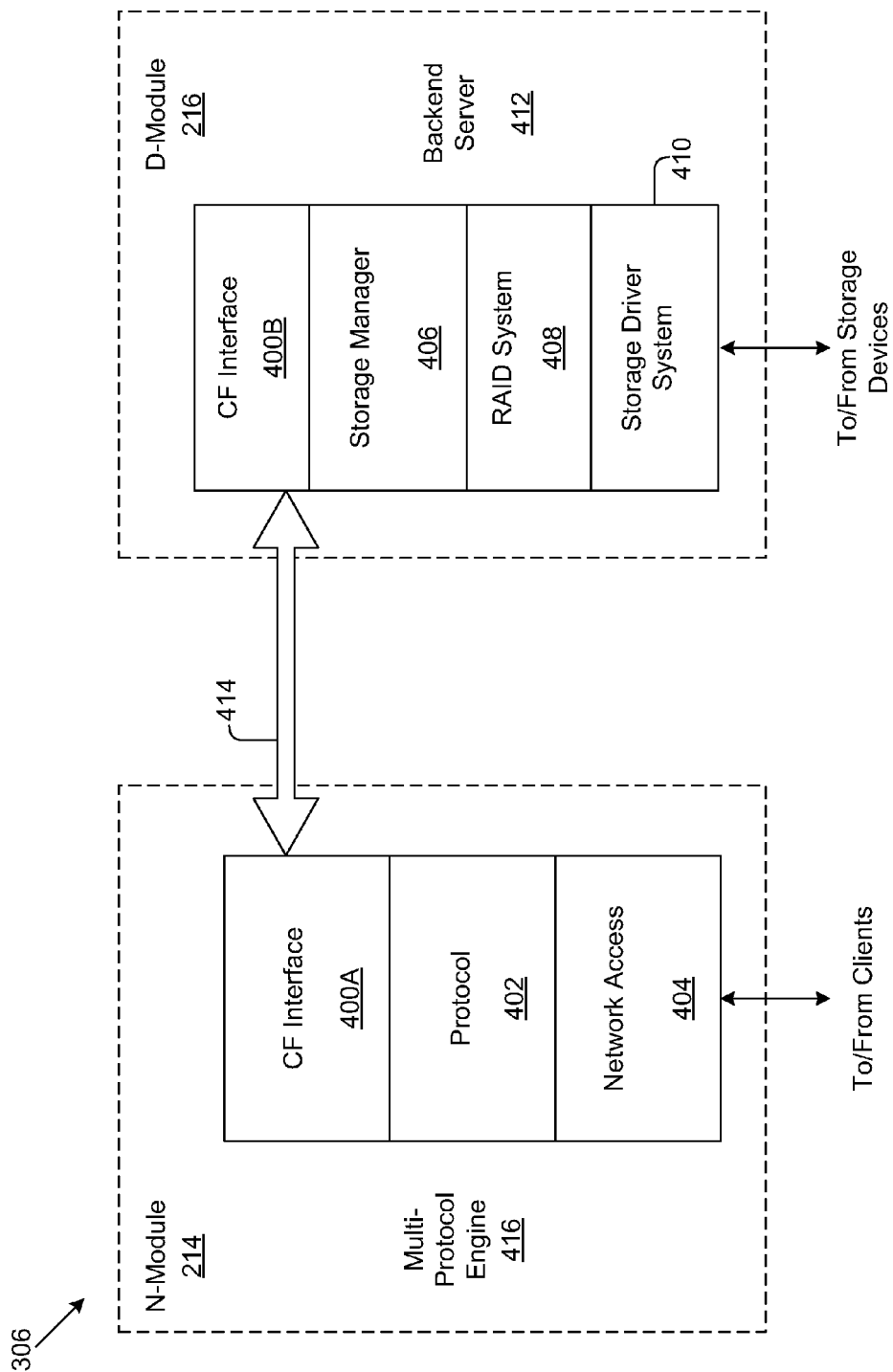
FIG. 4 illustrates an example of a storage operating system of a storage server node.

FIG. 4 is a diagram illustrating an example of storage operating system 306 that can be used with the replication techniques introduced here. The storage operating system 306 may be used to maintain various data structures for replicating storage volumes and providing access to replicated storage volumes, as described below in more detail.

In the illustrated embodiment the storage operating system 306 includes multiple functional layers organized to form an integrated network protocol stack or, more generally, a multi-protocol engine 416 that provides data paths for clients to access information stored on the node using block and file access protocols. The multiprotocol engine 416 in combination with underlying processing hardware also forms the N-module 214. The multi-protocol engine 416 includes a network access layer 404 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 416 also includes a protocol layer 402 which implements various higher-level network protocols, such as NFS, CIFS, Hypertext Transfer Protocol (HTTP), Internet small computer system interface (iSCSI), etc. Further, the multiprotocol engine 416 includes a cluster fabric (CF) interface module 400A which implements intra-cluster communication with D-modules and with other N-modules.

In addition, the storage operating system 306 includes a set of layers organized to form a backend server 412 that provides data paths for accessing information stored on the storage devices 212 of the node 208. The backend server 412 in combination with underlying processing hardware also forms the D-module 216. To that end, the backend server 412 includes a storage manager module 406 that manages any number of storage volumes, a RAID system module 408 and a storage driver system module 410.

The storage manager 406 primarily manages a file system (or multiple file systems) and serves client-initiated read and write requests. The RAID system 408 manages the storage and retrieval of information to and from the volumes/disks in accordance with a RAID redundancy protocol, such as RAID-4, RAID-5, or RAID-DP, while the storage driver system 410 implements a disk access protocol such as SCSI protocol or FCP.

The backend server 412 also includes a CF interface module 400B to implement intra-cluster communication 414 with N-modules and/or other D-modules. The CF interface modules 400A and 400B can cooperate to provide a single file system image across the D-modules 216 in the cluster. Thus, any network port of an N-module 214 that receives a client request can access any data container within the single file system image located on any D-module 216 of the cluster.

The CF interface modules 400A/400B implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module can be organized as a CF encoder/decoder. The CF encoder of, e.g., CF interface 400A on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 400B on D-module 216 de-encapsulates the CF message and processes the file system command.

In operation of a node 208, a request from a client 204 is forwarded as a packet over the network 206 and onto the node 208, where it is received at the network adapter 310 (FIG. 3). A network driver of layer 404 processes the packet and, if appropriate, passes it on to a network protocol and file access layer for additional processing prior to forwarding to the storage manager 406. At that point, the storage manager 406 generates operations to load (retrieve) the requested data from storage device 212 if it is not resident in memory 304. If the information is not in memory 304, the storage manager 406 indexes into a metadata file to access an appropriate entry and retrieve a logical virtual block number (VBN). The storage manager 406 then passes a message structure including the logical VBN to the RAID system 408; the logical VBN is mapped to a disk identifier and disk block number (DBN) and sent to an appropriate driver (e.g., SCSI) of the storage driver system 410. The storage driver accesses the DBN from the specified storage device 212 and loads the requested data block(s) in memory for processing by the node. Upon completion of the request, the node (and operating system) returns a reply to the client 204 over the network 206.

The data request/response "path" through the storage operating system 306 as described above can be implemented in general-purpose programmable hardware executing the storage operating system 306 as software or firmware. Alternatively, it can be implemented at least partially in specially designed hardware. That is, in an alternate embodiment of the technique introduced here, some or all of the storage operating system 306 is implemented as logic circuitry embodied within a field programmable gate array (FPGA) or an application specific integrated circuit (ASIC), for example.

The N-module 214 and D-module 216 each can be implemented as processing hardware configured by separately-scheduled processes of storage operating system 306; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

Figure 5A:
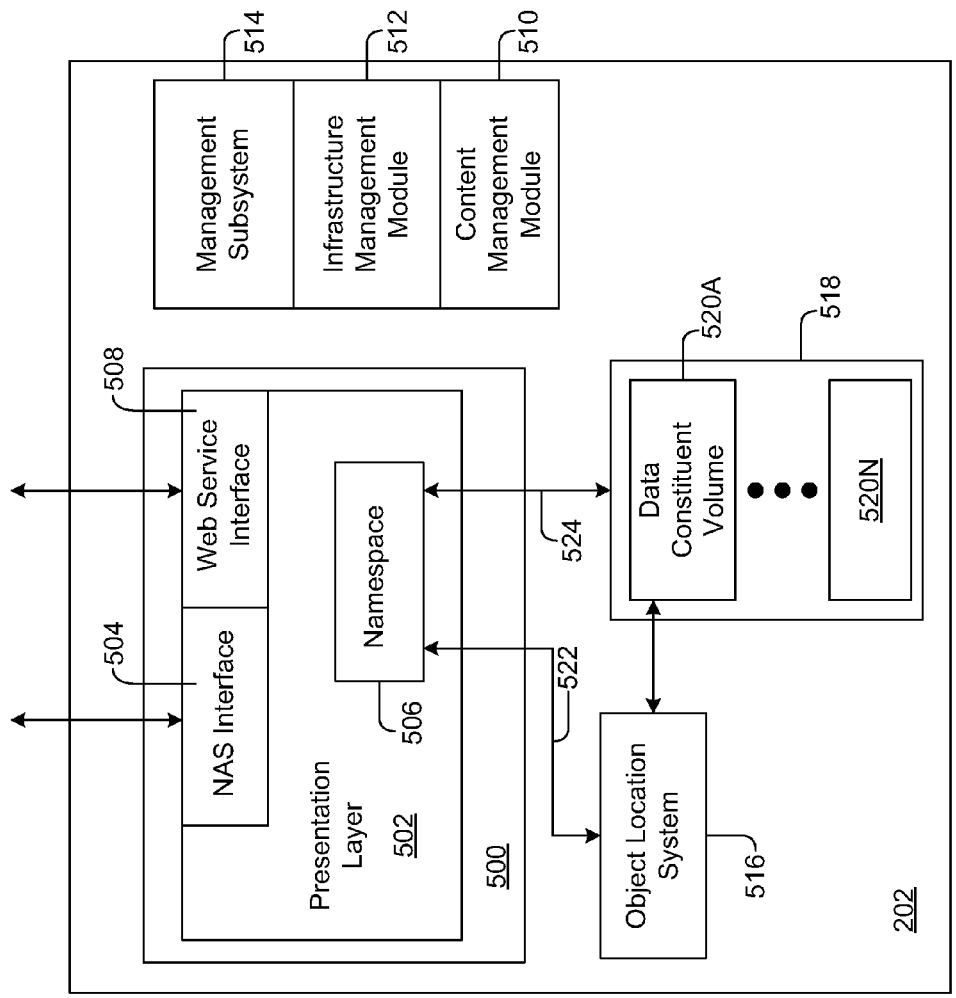
FIG. 5A illustrates the overall architecture of a content repository.

Overview of Content Repository:

The techniques introduced here generally relate to a content repository implemented in a network storage server system 202 such as described above. FIG. 5A illustrates the overall architecture of the content repository according to one embodiment. The content repository includes a distributed object store 518, an object location subsystem (OLS) 516, a presentation layer 502, and a management subsystem 514. Normally there will be a single instance of each of these components in the overall content repository, and each of these components can be implemented in any one server node 208 or distributed across two or more server nodes 208. The functional elements of each of these units (i.e., the OLS 516, presentation layer 502 and management subsystem 514) can be implemented by specially designed circuitry, or by programmable circuitry programmed with software and/or firmware, or a combination thereof. The data storage elements of these units can be implemented using any known or convenient form or forms of data storage device.

The distributed object store 518 provides the actual data storage for the data objects in the server system 202 and includes multiple data constituent volumes (may interchangeably be referred to as distinct single-node object stores 520). A "single-node" object store or data constituent volume is an object store that is implemented entirely within one node. Each data constituent volume 520 is a logical (non-physical) container of data, such as a data constituent volume or a logical unit (LUN). Some or all of the data constituent volumes 520 that make up the distributed object store 518 can be implemented in separate server nodes 208. Alternatively, all of the data constituent volumes 520 that make up the distributed object store 518 can be implemented in the same server node. Any given server node 208 can access multiple data constituent volumes 520 and can include multiple data constituent volumes 520.

The distributed object store 518 provides location-independent addressing of data objects (i.e., data objects can be moved among data constituent volumes 520 without changing the data objects' addressing), with the ability to span the object address space across other similar systems spread over geographic distances. Note that the distributed object store 518 has no namespace; the namespace for the server system 202 is provided by the presentation layer 502.

The term "namespace" as used herein refers to a virtual hierarchical collection of unique volume names or identifiers and directory paths to the volumes, in which each volume represents a virtualized container storing a portion of the namespace descending from a single root directory. For example, each volume associated with a namespace can be configured to store one or more data containers, scripts, word processing documents, executable programs and others.

The presentation layer 502 provides access to the distributed object store 518. It is generated by at least one presentation module 500 (i.e., it may be generated collectively by multiple presentation modules 500, one in each multiple server nodes 208). The presentation module 500 can be in the form of specially designed circuitry, or programmable circuitry programmed with software and/or firmware, or a combination thereof.

The presentation layer 502 receives client requests, translates them into an internal protocol and sends them to the appropriate D-module 216. The presentation layer 502 provides two or more independent interfaces for accessing stored data, e.g., a conventional NAS interface 504 and a Web Service interface 508. The NAS interface 504 allows access to the object store 518 via one or more conventional NAS protocols, such as NFS and/or CIFS. Thus, the NAS interface 504 provides a file system-like interface to the content repository.

The Web Service interface 508 allows access to data stored in the object store 518 via either "named object access" or "raw object access" (also called "flat object access"). Named object access uses a namespace (e.g., a file system-like directory-tree interface for accessing data objects), as does NAS access; whereas raw object access uses system-generated global object IDs to access data objects, as described further below. The Web Service interface 508 allows access to the object store 518 via Web Service (as defined by the W3C), using for example, a protocol such as Simple Object Access Protocol (SOAP) or a RESTful (REpresentational State Transfer-ful) protocol, over HTTP.

The presentation layer 502 further provides at least one namespace 506 (may also be referred to as namespace volume) for accessing data via the NAS interface or the Web Service interface. In one embodiment this includes a Portable Operating System Interface (POSIX) namespace. The NAS interface 504 allows access to data stored in the object store 518 via the namespace(s) 506. The Web Service interface 508 allows access to data stored in the object store 518 via either the namespace(s) 506 (by using named object access) or without using the namespace(s) 506 (by using "raw object access"). Thus, the Web Service interface 508 allows either named object access or raw object access; and while named object access is accomplished using a namespace 506, raw object access is not. Access by the presentation layer 502 to the object store 518 is via either a "fast path" 524 or a "slow path" 522, as discussed further below.

The function of the OLS 516 is to store and provide valid location IDs (and other information, such as policy IDs) of data objects, based on their global object IDs (these parameters are discussed further below). This is done, for example, when a client 204 requests access to a data object by using only the global object ID instead of a complete object handle including the location ID, or when the location ID within an object handle is no longer valid (e.g., because the target data object has been moved). Note that the system 202 thereby provides two distinct paths for accessing stored data, namely, the fast path 524 and the slow path 522. The fast path 524 provides data access when a valid location ID is provided by a client 204 (e.g., within an object handle). The slow path 522 makes use of the OLS and is used in all other instances of data access. The fast path 524 is so named because a target data object can be located directly from its (valid) location ID, whereas the slow path 522 is so named because it requires a number of additional steps (relative to the fast path) to determine the location of the target data object.

The management subsystem 514 includes a content management component 510 and an infrastructure management component 512. The infrastructure management component 512 includes logic to allow an administrative user to manage the storage infrastructure (e.g., configuration of nodes, storage devices, volumes, LUNs, etc.). The content management component 510 is a policy based data management subsystem for managing the lifecycle of data objects (and optionally the metadata) stored in the content repository, based on user-specified policies. It can execute actions to enforce defined policies in response to system-defined trigger events and/or user-defined trigger events (e.g., attempted creation, deletion, access or migration of an object).

The specified policies may relate to, for example, system performance, data protection and data security. Performance related policies may relate to, for example, which logical container a given data object should be placed in, migrated from or to, when the data object should be migrated or deleted, etc. Data protection policies may relate to, for example, data backup and/or data deletion. Data security policies may relate to, for example, when and how data should be encrypted, who has access to particular data, etc. The specified policies can also include polices for power management, storage efficiency, data retention, and deletion criteria. The policies can be specified in any known, convenient or desirable format and method. A "policy" in this context is not necessarily an explicit specification by a user of where to store what data, when to move data, etc. Rather, a "policy" can be a set of specific rules regarding where to store what, when to migrate data, etc., derived by the system from the end user's SLOs, i.e., a more general specification of the end user's expected performance, data protection, security, etc. For example, an administrative user might simply specify a range of performance that can be tolerated with respect to a particular parameter and in response the management subsystem 514 would identify the appropriate data objects that need to be migrated, where they should get migrated to, and how quickly they need to be migrated.

Figure 5B:
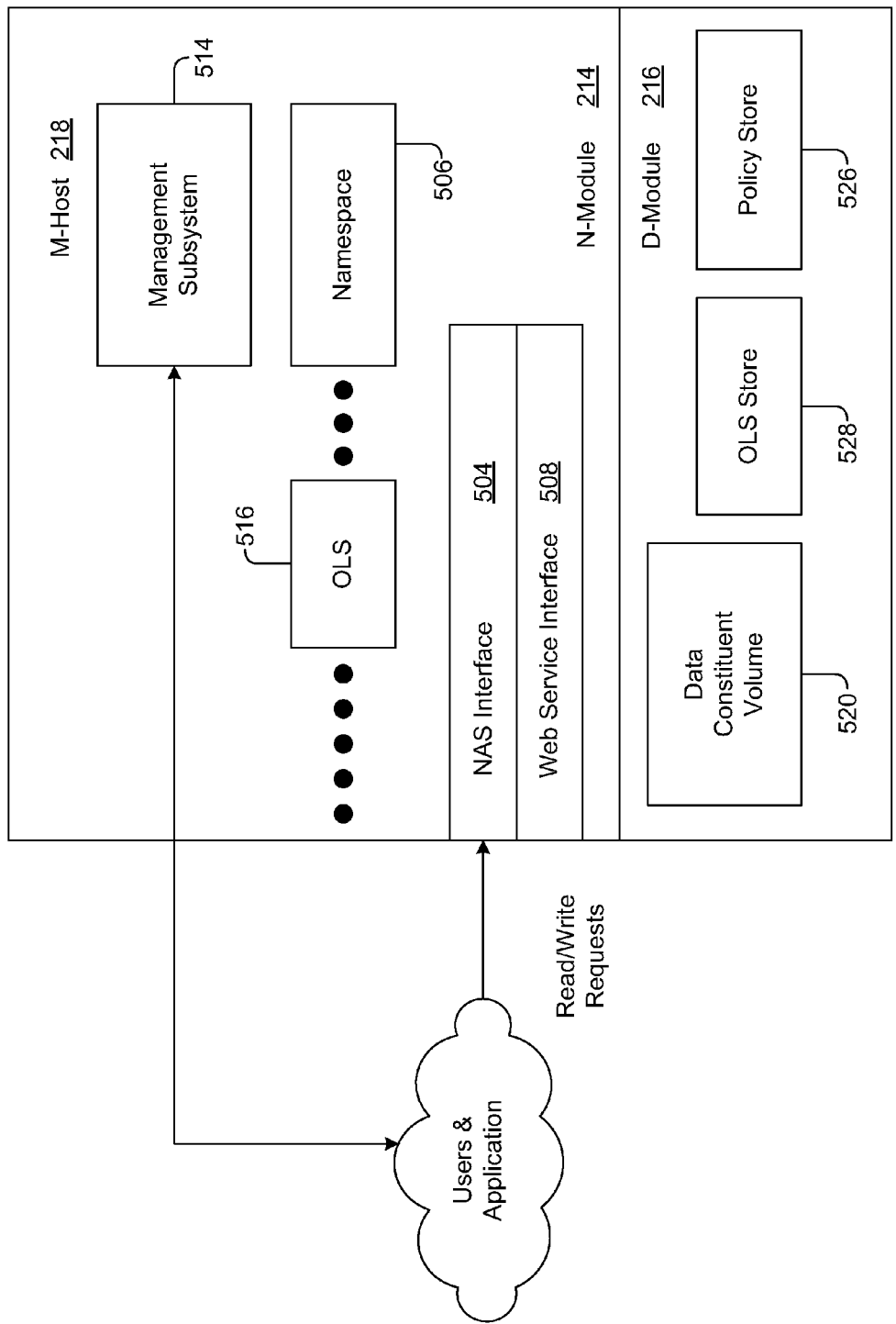
FIG. 5B illustrates a content repository that can be implemented in the clustered architecture of FIGS. 2 through 4.

FIG. 5B illustrates an example of how the content repository can be implemented relative to the clustered architecture in FIGS. 2 through 4. Although FIG. 5B illustrates the system relative to a single server node 208, it will be recognized that the configuration shown in FIG. 5B actually can be implemented by two or more (or all) of the server nodes 208 in a cluster.

In one embodiment, the distributed object store 518 is implemented by providing at least one data constituent volume 520 in each of at least two D-modules 216 in the system (any given D-module 216 can include zero or more single node object stores 520). Also implemented in each of at least two D-modules 216 in the system are: an OLS store 528 that contains mapping data structures used by the OLS 516 including valid location IDs and policy IDs; and a policy store 526 (e.g., a database) that contains user-specified policies relating to data objects (note that at least some policies or policy information may also be cached in the N-module 214 to improve performance).

The presentation layer 502 is implemented at least partially within each N-module 214. In one embodiment, the OLS 516 is implemented partially by the N-module 214 and partially by the corresponding M-host 218, as illustrated in FIG. 5B. More specifically, in one embodiment the functions of the OLS 516 are implemented by a special daemon in the M-host 218 and by the presentation layer 502 in the N-module 214.

In one embodiment, the management subsystem 514 is implemented at least partially within each M-host 218. Nonetheless, in some embodiments, any of these subsystems may also be implemented at least partially within other modules. For example, at least a portion of the content management component 510 of the management subsystem 514 can be implemented within one or more N-modules 214 to allow, for example, caching of policies in such N-modules and/or execution/application of policies by such N-module(s). In that case, the processing logic and state information for executing/applying policies may be contained in one or more N-modules 214, while processing logic and state information for managing policies is stored in one or more M-hosts 218. Administrative users can specify policies for use by the management subsystem 514, via a user interface provided by the M-host 218 to access the management subsystem 514.

Figure 5C:
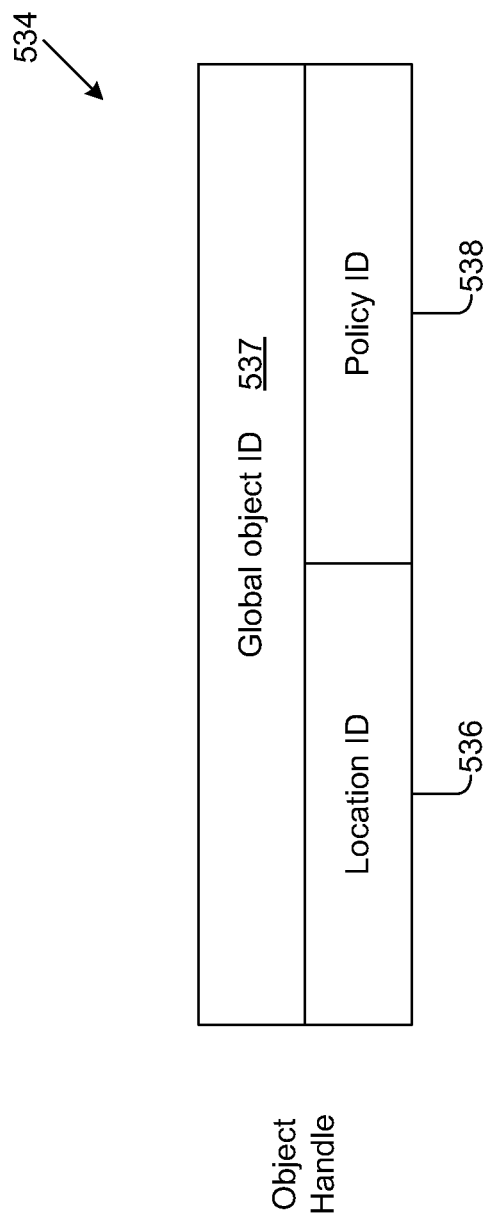
FIG. 5C illustrates a multilevel object handle.

As noted above, the distributed object store enables both path-based access to data objects as well as direct access to data objects. For purposes of direct access, the distributed object store uses a multilevel object handle, as illustrated in FIG. 5C. When a client 204 creates a data object, it receives an object handle 534 as the response to creating the object. This is similar to a file handle that is returned when a file is created in a traditional storage system. The first level of the object handle is a system-generated globally unique number, called a global object ID, 537 that is permanently attached to the created data object. The second level of the object handle is a "hint" which includes the location ID 536 of the data object and, in the illustrated embodiment, the policy ID 538 of the data object. Clients 204 can store this object handle 534, containing the global object ID 537, location ID 536 and policy ID 538.

When a client 204 attempts to read or write the data object using the direct access approach, the client includes the object handle of the object in its read or write request to the server system 202. The server system 202 first attempts to use the location ID (within the object handle), which is intended to be a pointer to the exact location within a volume where the data object is stored. In the common case, this operation succeeds and the object is read/written. This sequence is the "fast path" 524 for I/O (see FIG. 5A).

If, however, an object is moved from one location to another (for example, from one volume to another), the server system 202 creates a new location ID for the object. In that case, the old location ID becomes stale (invalid). The client may not be notified that the object has been moved or that the location ID is stale and may not receive the new location ID for the object, at least until the client subsequently attempts to access that data object (e.g., by providing an object handle with an invalid location ID). Or, the client may be notified but may not be able or configured to accept or understand the notification.

The current mapping from global object ID to location ID is stored reliably in the OLS 516. If, during fast path I/O, the server system 202 discovers that the target data object no longer exists at the location pointed to by the provided location ID, this means that the object must have been either deleted or moved. Therefore, at that point the server system 202 will invoke the OLS 516 to determine the new (valid) location ID for the target object. The server system 202 then uses the new location ID to read/write the target object. At the same time, the server system 202 invalidates the old location ID and returns a new object handle to the client that contains the unchanged and unique global object ID, as well as the new location ID. This process enables clients to transparently adapt to objects that move from one location to another (for example in response to a change in policy).

An enhancement of this technique is for a client 204 never to have to be concerned with refreshing the object handle when the location ID changes. In this case, the server system 202 is responsible for mapping the unchanging global object id to location ID. This can be done efficiently by compactly storing the mapping from global object ID to location ID in, for example, cache memory of one or more N-modules 214.

As noted above, the distributed object store enables path-based access to data objects as well, and such path-based access is explained in further detail in the following sections.

Object Location Transparency using the Presentation Layer:

In a traditional storage system, a file is represented by a path such as "/u/foo/bar/file.doc". In this example, "u" is a directory under the root directory "/", "foo" is a directory under "u", and so on. Therefore, a file is uniquely identified by a single path. However, since file handles and directory handles are tied to a location in a traditional storage system, an entire path name is tied to a specific location (e.g., as indicated by an inode of the file), making it difficult to move files around without having to rename them.

An inode is a data structure, e.g., a 128-byte structure, which is used to store information, such as metadata, about a data container. Examples of data containers, as may be used herein, include files, directories, etc. The metadata contained in an inode may include data information, e.g., ownership of a file, access permission for the file, size of the file, file type, location of the file on disk, etc., as is described in more detail below. The file system uses a file handle, i.e., an identifier that includes an inode number, to retrieve an inode from a storage disk.

Figure 5D:
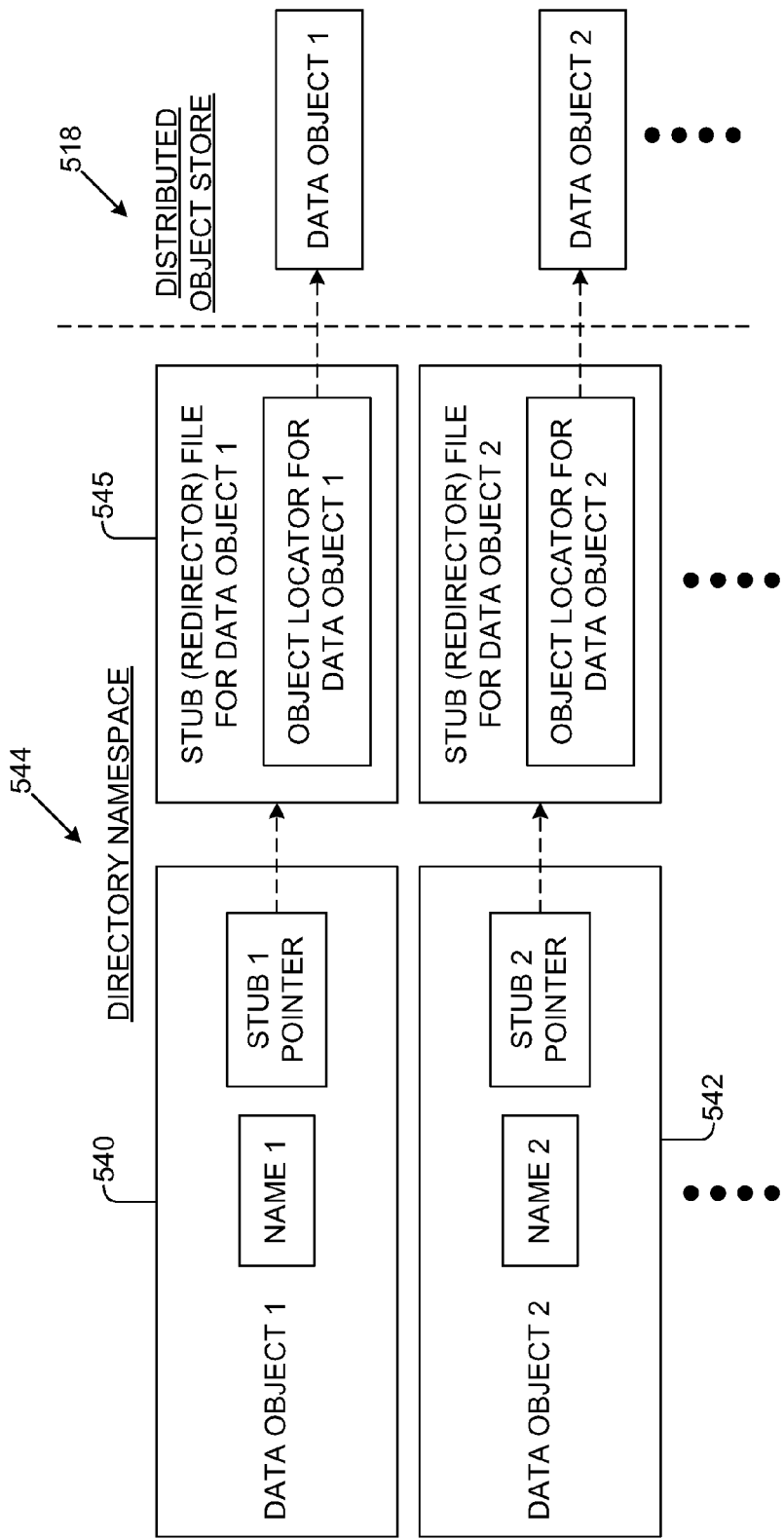
FIG. 5D illustrates a mechanism for a storage system to introduce a layer of separation between a directory entry of a data object and the physical location where the data object is stored.

Now refer to FIG. 5D, which illustrates a mechanism that allows the server system 202 to break the tight relationship between path names and location. As illustrated in the example of FIG. 5D, path names of data objects in the server system 202 are stored in association with a namespace (e.g., a directory namespace 544). The directory namespace 544 maintains a separate directory entry (e.g., 540, 542) for each data object stored in the distributed object store 518. A directory entry, as indicated herein, refers to an entry that describes a name of any type of data object (e.g., directories, files, other such logical containers of data, etc.). Each directory entry includes, for example, a path name (e.g., NAME 1) (i.e., a logical address) of the data object and a pointer (e.g., REDIRECTOR POINTER 1) (shown as stub 1 pointer) for mapping the directory entry to the data object.

In a traditional storage system, the pointer (e.g., an inode number) directly maps the path name to an inode associated with the data object. On the other hand, in the illustrated embodiment shown in FIG. 5D, the pointer of each data object points to a stub file or a "redirector file" (used interchangeably in this specification) associated with the data object. A redirector file, as indicated herein, refers to a file that maintains an object locator of the data object. The object locator of the data object could either be the multilevel object handle 534 or just the global object ID of the data object. In the illustrated embodiment, the redirector file (e.g., redirector file for data object 1) is also stored within the directory namespace 544. In addition to the object locator data, the redirector file may also contain other data, such as metadata about the location of the redirector file, etc.

As illustrated in FIG. 5D, for example, the pointer included in the directory entry 540 of data object 1 points to a redirector file 545 for data object 1 (instead of pointing to, for example, the inode of data object 1). The directory entry 540 does not include any inode references to data object 1. The redirector file for data object 1 includes an object locator (i.e., the object handle or the global object ID) of data object 1. As indicated above, either the object handle or the global object ID of a data object is useful for identifying the specific location (e.g., a physical address) of the data object within the distributed object store 518. Accordingly, the server system 202 can map the directory entry of each data object to the specific location of the data object within the distributed object store 518. By using this mapping in conjunction with the OLS 516 (i.e., by mapping the path name to the global object ID and then mapping the global object ID to the location ID), the server system 202 can mimic a traditional file system hierarchy, while providing the advantage of location independence of directory entries.

By having the directory entry pointer of a data object point to a redirector file (containing the object locator information) instead of pointing to an actual inode of the data object, the server system 202 introduces a layer of indirection between (i.e., provides a logical separation of) directory entries and storage locations of the stored data object. This separation facilitates transparent migration (i.e., a data object can be moved without affecting its name), and moreover, it enables any particular data object to be represented using multiple path names, thereby facilitating navigation. In particular, this allows the implementation of a hierarchical protocol such as NFS on top of an object store, while at the same time allowing access via a flat object address space (wherein clients directly use the global object ID to access objects) and maintaining the ability to do transparent migration.

Figure 5E:
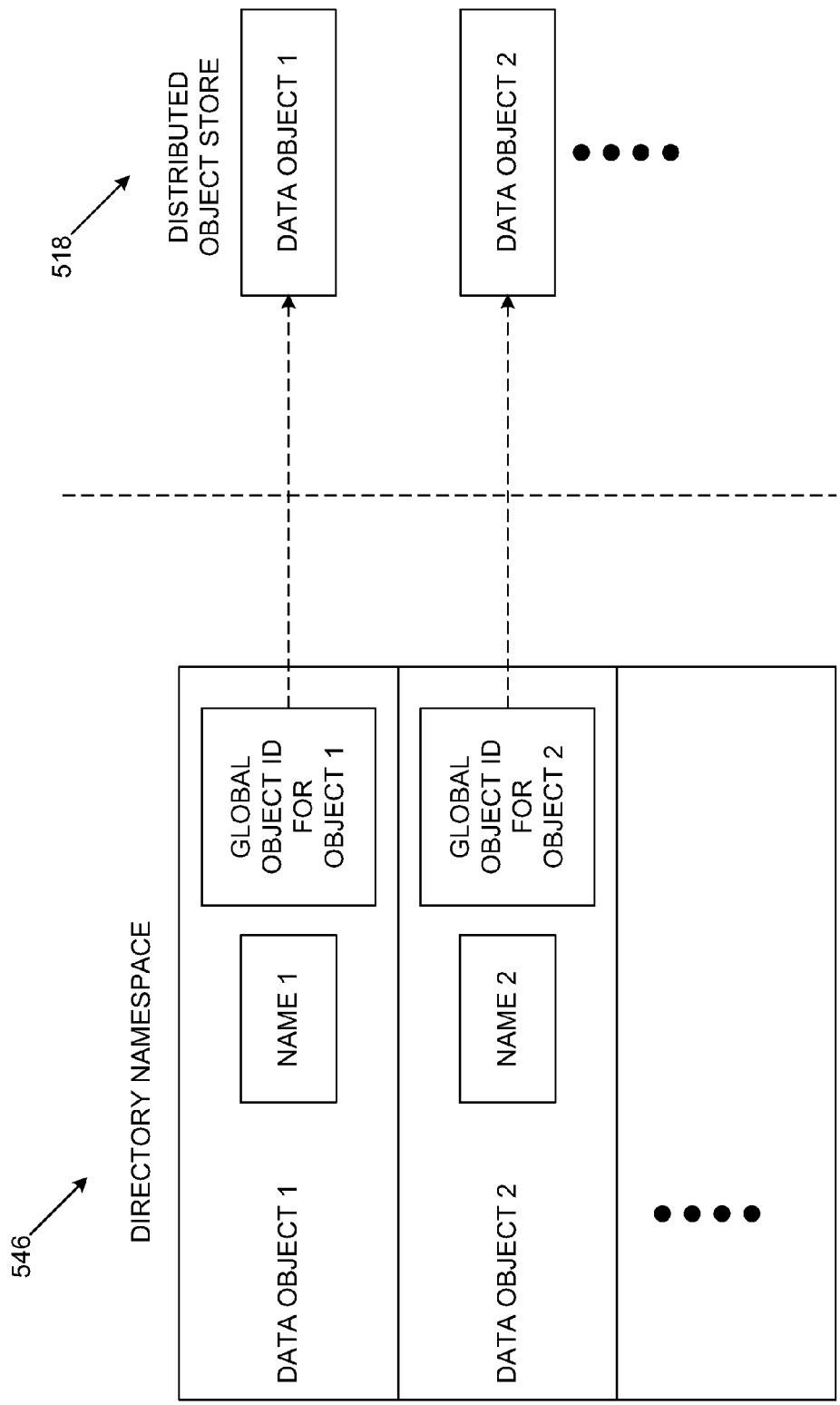
FIG. 5E illustrates a mechanism that allows a storage system to introduce a layer of separation between the directory entry of the data object and the physical location of the data object by including a global object ID within the directory entry.

In one embodiment, instead of using a redirector file for maintaining the object locator (i.e., the object handle or the global object ID) of a data object, the server system 202 stores the global object ID of the data object directly within the directory entry of the data object. An example of such an embodiment is depicted in FIG. 5E. In the illustrated example, the directory entry for data object 1 includes a path name and the global object ID of data object 1. In a traditional server system, the directory entry would contain a path name and a reference to an inode (e.g., the inode number) of the data object. Instead of storing the inode reference, the server system 202 stores the global object ID of data object 1 in conjunction with the path name within the directory entry of data object 1. As explained above, the server system 202 can use the global object ID of data object 1 to identify the specific location of data object 1 within the distributed object store 518. In this embodiment, the directory entry includes an object locator (i.e., a global object ID) instead of directly pointing to the inode of the data object, and therefore still maintains a layer of indirection between the directory entry and the physical storage location of the data object. As indicated above, the global object ID is permanently attached to the data object and remains unchanged even if the data object is relocated within the distributed object store 518.

Figure 6A:
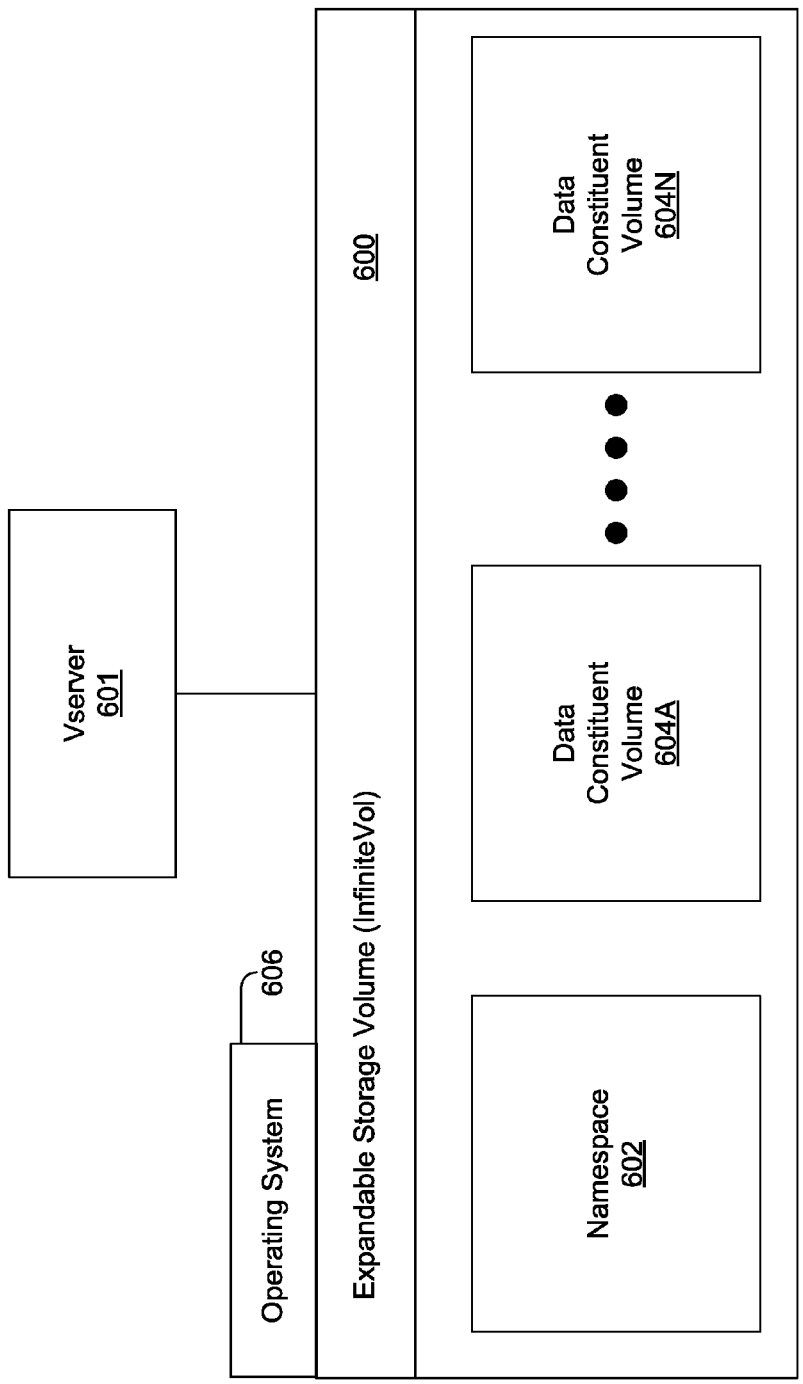
FIG. 6A shows a block diagram of an expandable storage volume that is replicated.

Infinite Volume:

FIG. 6A shows an example of an expandable storage volume (may also be referred to as an Infinite Volume or "InfiniteVol") 600 that may be presented to a vserver 601 and used by clients for storing information within the content repository described above, according to one embodiment. InfiniteVol 600 may include a namespace storage node 602 (similar to namespace 506 described above with respect to FIGS. 5A-5D) and a plurality of data volumes 604A-604N. Here, a data volume may include data stored on one or more physical storage devices that are associated with the storage nodes 208.1-208.N of the InfiniteVol 600. The storage nodes are similar to single node object stores 520 described above with respect to FIGS. 5A-5D. The namespace storage node 602 is used to store the directory 544 or directory namespace 546, as detailed above. The namespace storage node 602 further maintains the file system 608 of the InfiniteVol 600 (i.e., the file system of the clustered storage system), where the file system 608 presents the information stored within the content repository of the InfiniteVol 600 to the clients. Also, each data storage node may have its own local file system and may be used to store the clients' data. FIG. 6C provides additional details on the local file system maintained by each data storage node and its function within the InfiniteVol 600.

Figure 6B:
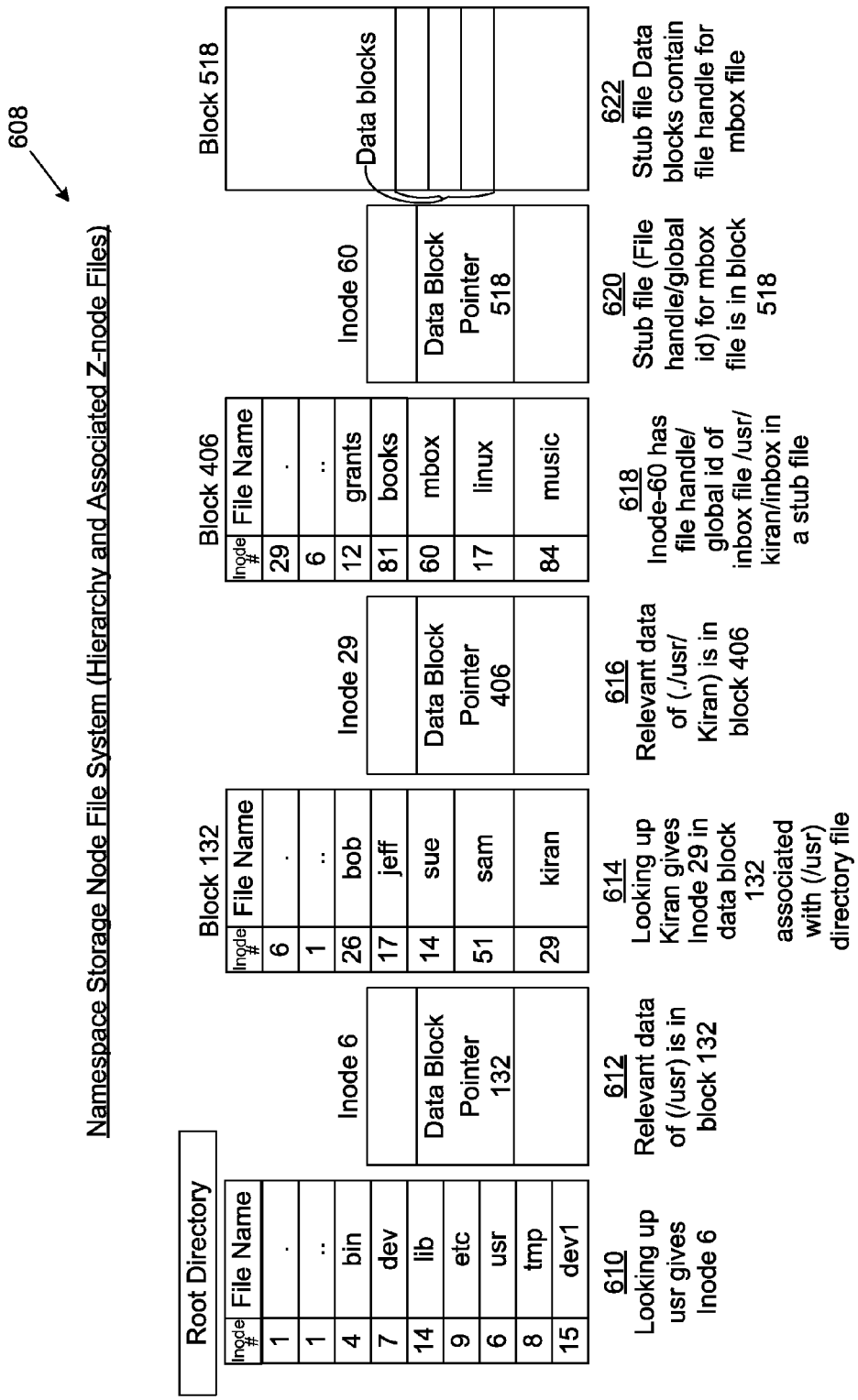
FIG. 6B provides an illustrative example of utilizing the namespace storage node's file system to access file with pathname "./usr/kiran/mbox".
Figure 6C:
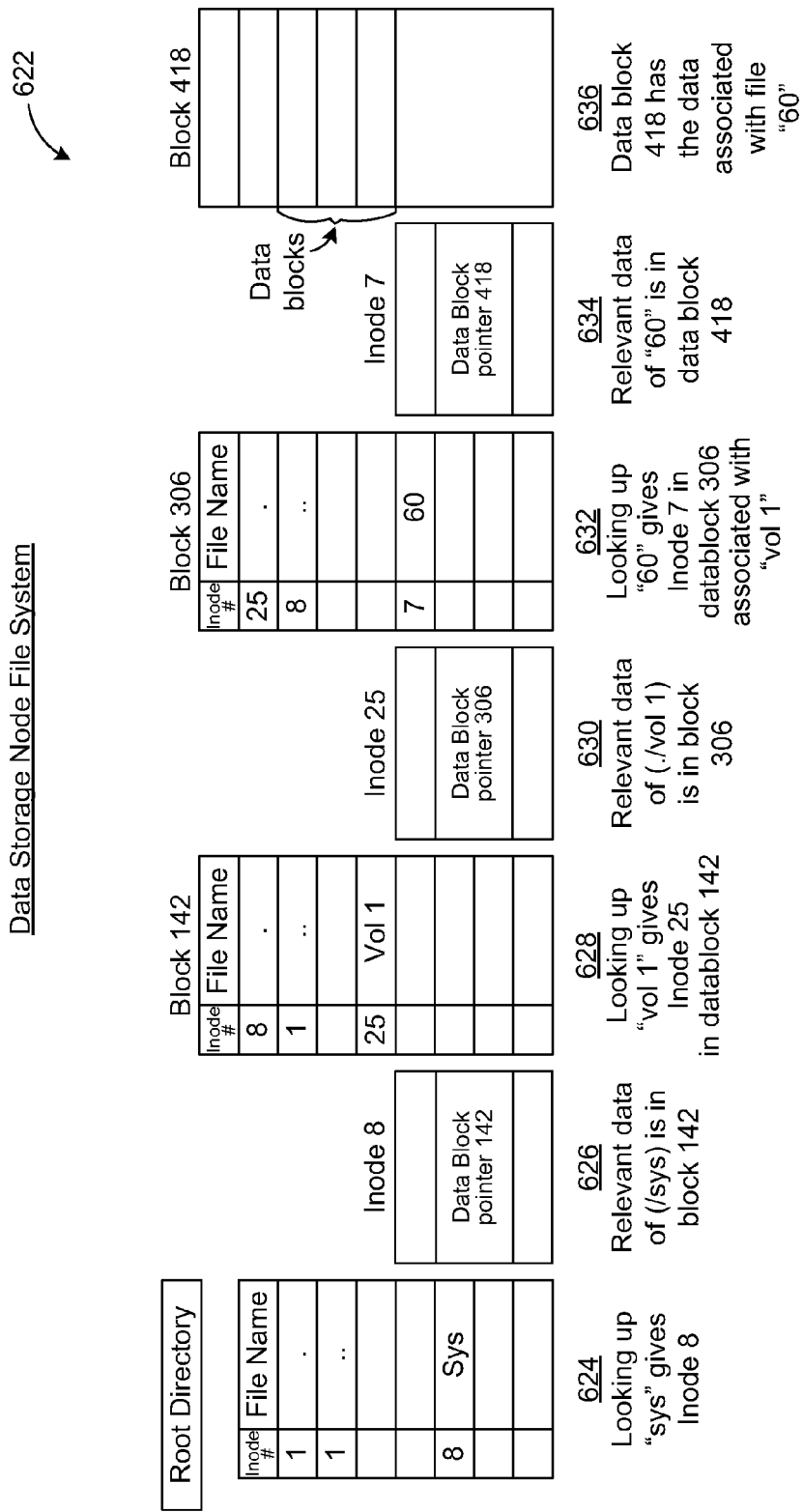
FIG. 6C provides an illustrative example of utilizing data storage node file system to access data associated with file "inbox" in path "./sys/vol1/60".

FIG. 6B illustrates a file system 608 and its associated inode data, maintained by a storage operating system 606, 306 of the InfiniteVol 600. In FIG. 6B, the file system 608 is used by the storage operating system 606 to logically organize and present a file "mbox" to the clients 204.1 through 204.M (FIG. 1), where the data associated with the file "mbox" is stored within the content repository of the InfiniteVol 600 under path name "./usr/kiran/mbox". As discussed earlier with reference to FIG. 5D, in a file system of a traditional storage system, a pointer (e.g., an inode number) directly maps the path name to an inode associated with the data object. However, in InfiniteVol 600, the file system, maintained by the namespace storage node 602, maps the path name to a stub file. The stub file, as indicated herein, refers to the file that maintains an object locator of the data object. The object locator of the data object could be a multilevel object handle 534 returned by one of the data storage nodes 208.1-208.N after storing the data object within itself.

In FIG. 6B, the file "mbox" is created and stored by the storage operating system 606 under the pathname "./usr/kiran/mbox", provided by one of the clients 204.1 through 204.N, in InfiniteVol 600. The storage operating system 606 creates in the file system 608 the various directories and sub directories in the pathname, such as directory "usr" and sub directory "kiran" under directory "usr", if the directories/sub directories weren't already present in the file system 602, and associates an inode file with each of the directories. The "inode" file, shown in FIG. 7C, contains the metadata associated with each of the directories/sub directories. One of the purposes of the inode 785, as discussed above, is to store metadata about a particular directory, such as a pointer 786 to the data blocks associated with the directory, the size 787 (e.g., in kilobytes) of the directory, the number 788 of data blocks, the link count 789 (number of references to that directory), permissions 790 that are associated with the directory, creation time/date 791 of the directory, and access time/date 792 to the directory.

Further, a root directory 610 of the file system 608 maintains a mapping between the files/directories under the root "." of the file system 608 and their corresponding inode files. Additionally, in the file system 608, the inode file container number "6" 612 is associated with directory "usr" and inode file container number "29" 616 is associated with directory "kiran". The inode files container number "6" 612 and container number "29" 616 include pointers to data blocks associated with the directories "usr" and "kiran" respectively. The data blocks associated with directories, such as "usr" and "kiran", contain a lookup table, mapping filenames to the inode numbers of the various files/directories under the directories. Here, in FIG. 6B, the lookup table 614 in data block "132" is associated with directory "usr" and the lookup table 618 in data block "406" is associated with directory "kiran". In addition, the file "mbox" is created and stored under sub directory "kiran" in the pathname "./usr/kiran/mbox". The inode file container number "60" 620 is created and associated with the regular file "mbox" (as opposed to directory type files such as "usr" and "kiran"), where the inode file container number "60" 620 stores all the meta data associated with the file "mbox" including the data blocks associated with the file "mbox". The inode files container number "60" 620 includes pointers to data blocks associated with the file "mbox".

As discussed earlier, unlike a traditional file system where the data blocks associated with regular files contain the data associated with the regular files, in the InfiniteVol 600 namespace 602, the data blocks associated with regular files contain an object locator of the data associated with the regular files. Here, the data blocks 622 stored in block "518", associated with the "mbox" regular file, contain a multilevel object handle 534 returned by one of the data storage nodes 208.1-208.N after storing the data associated with the "mbox" file within itself. Therefore, any modification to the data associated with the "mbox" file, such as addition or deletion of content from the data, will be carried out in the data storage node 208.1-208.N, where the "mbox" file's data is stored in, without any modification to the file system 602 or the associated inode files stored in the namespace storage node 602.

For example, when a client sends a request to modify the content of file "mbox" under pathname "./usr/kiran/mbox", in one embodiment, the storage operating system 606 could utilize the directory namespace 544 to lookup the stub file pointer (e.g., inode container number of stub file) to access and retrieve the multilevel object handle 534 that is returned by the data storage node 208.1 after storing the data associated with the "mbox" file within its storage node 208.1. In one embodiment, to perform the content modification requested by the client, the storage operating system 606 sends the client's content modification request along with the retrieved multilevel object handle 534 to the data storage node 208.1 to carry out the request.

In another embodiment, when a client sends a request to modify the content of file "mbox" under pathname "./usr/kiran/mbox", the storage operating system 606 first retrieves the root directory lookup table 610 of the file system 608 and identifies the inode container number of the directory "usr" as inode container number "6" 612. The file system next retrieves the inode container number "6" 612 and identifies the pointer "132" to the data block storing the data associated with directory "usr". In this case, given that "usr" is a directory, the data block associated with pointer "132" contains a lookup table mapping filenames to the inode numbers of the various files/directories under the directory "usr". The storage operating system 606 next searches for the inode container number of the sub-directory "kiran" (based on client provided pathname "./usr/kiran/mbox") in the lookup table 614 associated with data block of the directory "usr" and identifies the inode container number of the subdirectory "kiran" as inode container number "29" 616. The storage operating system 606 retrieves the inode container number "29" 616 and identifies the pointer "406" to the data block storing the data associated with subdirectory "kiran". In this case, given that "kiran" is a directory, the data block associated with pointer "406" contains a lookup table mapping filenames to the inode numbers of the various files/directories under the directory "kiran".

The storage operating system 606 next searches for the inode container number of the regular file "mbox" (based on client provided pathname "./usr/kiran/mbox") in the lookup table 618 associated with data block of the directory "kiran" and identifies the inode container number of the file "mbox" as inode container number "60" 620. The storage operating system 606 retrieves the inode container number "60" 620 and identifies the pointer "518" to the data block storing the data associated with regular file "mbox". In this case, given that "mbox" is a regular file, the data block associated with pointer "518" contains a multilevel object handle 534, returned by the data storage node 208.1, to the data associated with the "mbox" file that is stored within the node 208.1.

Figure 7A:
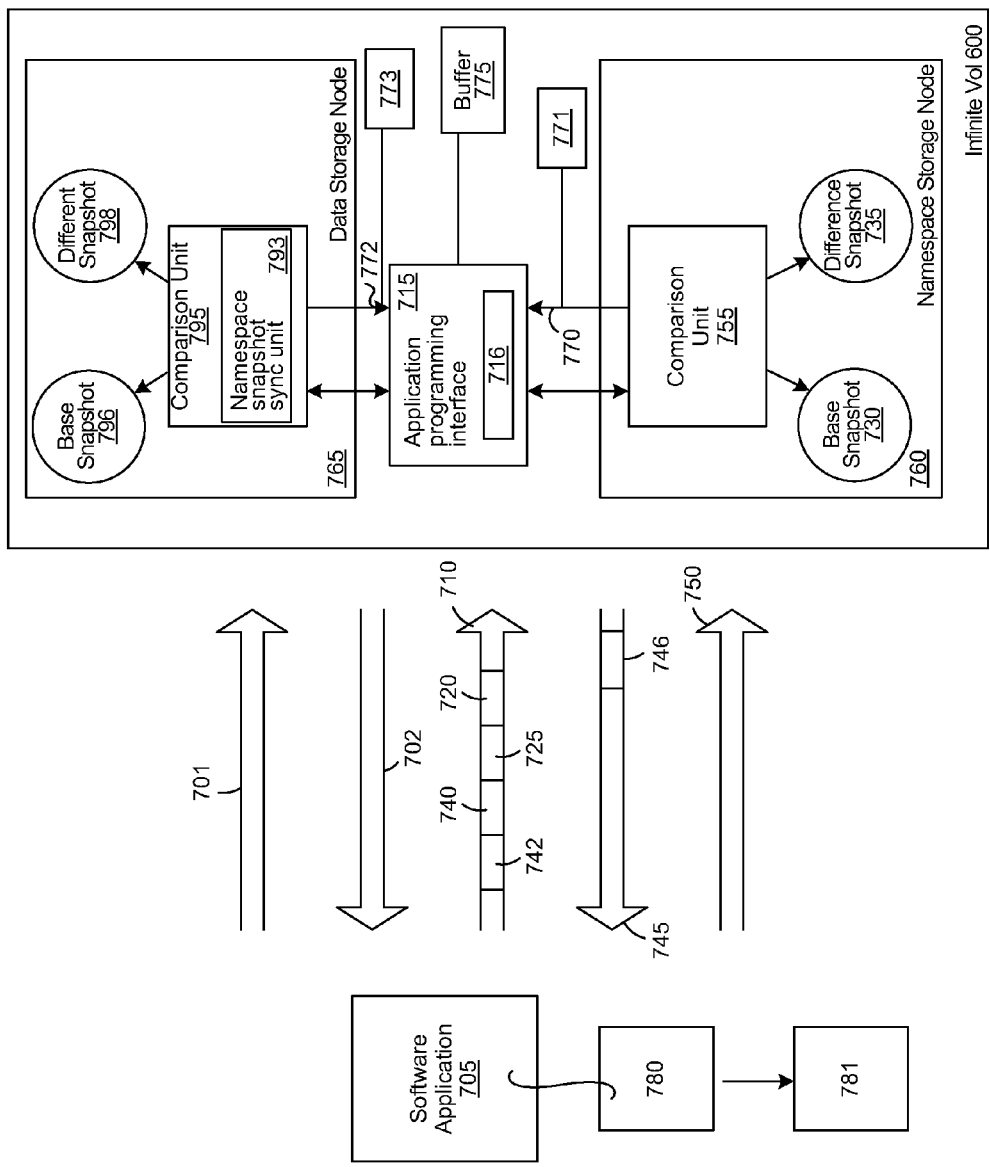
FIG. 7A is a block diagram illustrating how changes to metadata files (e.g., inode files) in the expandable storage volume can be used to determine files and directories that have changed (i.e., created, deleted, modified, etc.) in the file system.
Figure 7B:
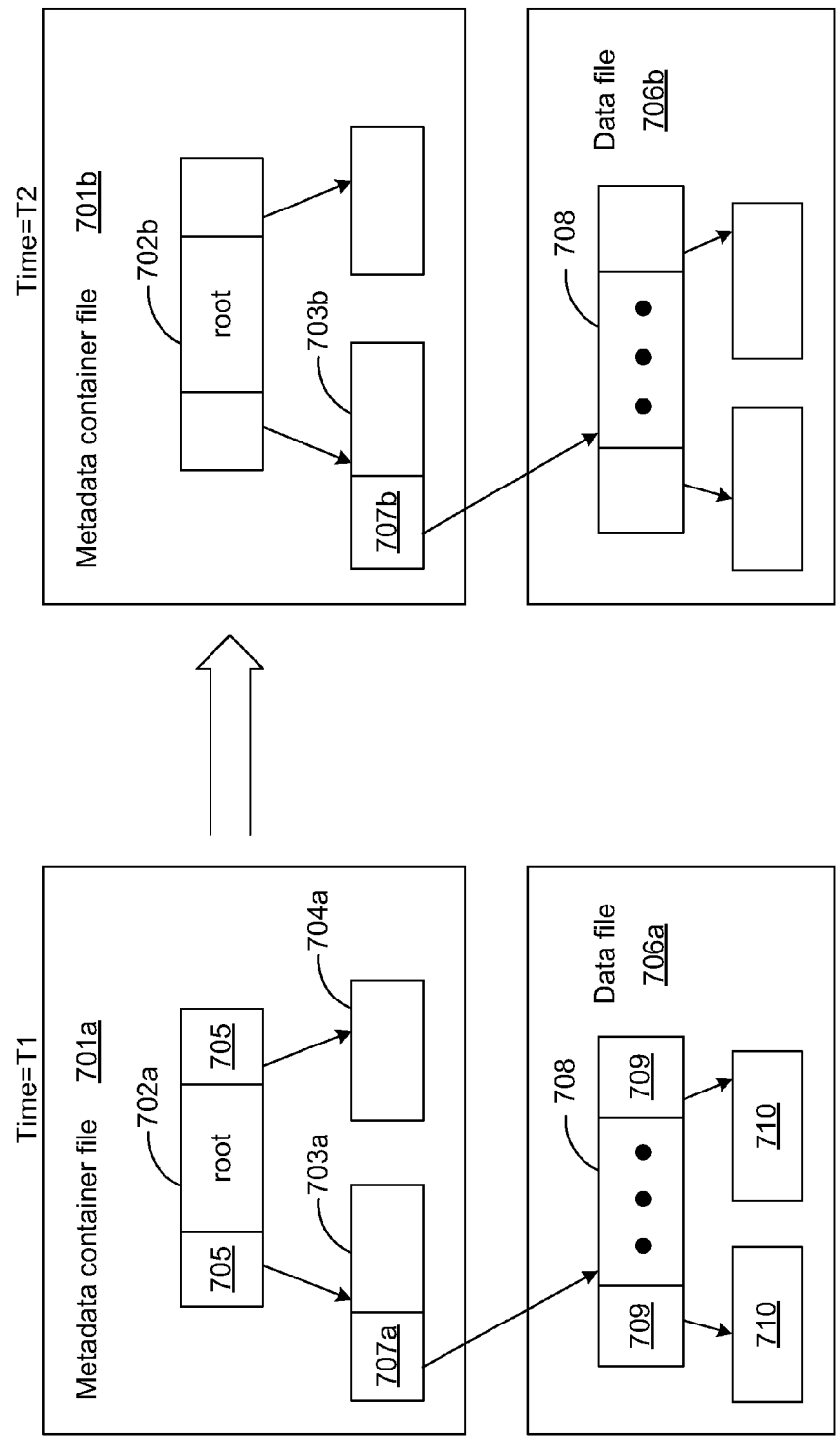
FIG. 7B is a block diagram illustrating how changes to metadata files (e.g., inode files) in a given storage node of the expandable storage volume can be used to determine files and directories that have changed (i.e., created, deleted, modified, etc.) in the file system.
Figure 7C:
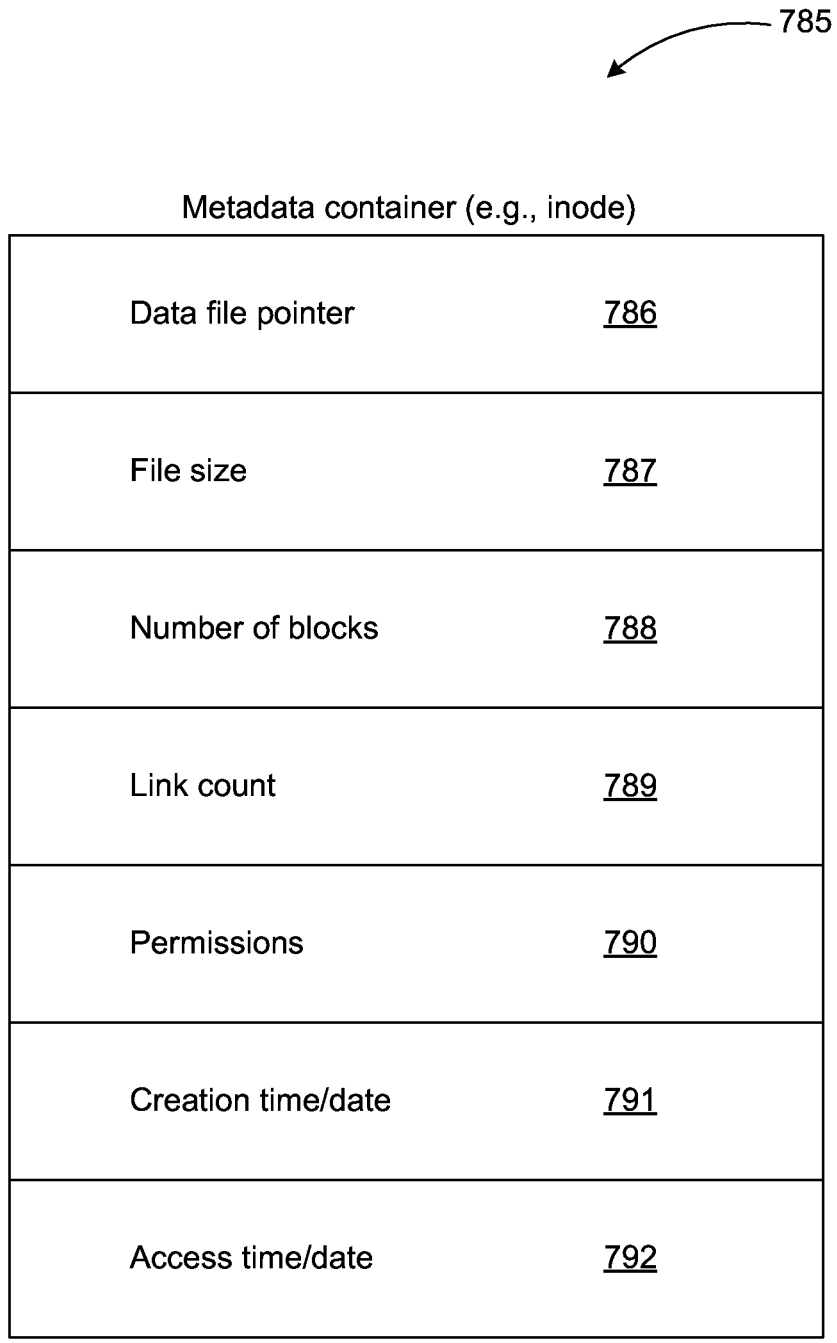
FIG. 7C is a block diagram of a metadata container (e.g., inode) that can be used in an embodiment of the technique introduced here.

In one embodiment, to perform the content modification requested by the client, the storage operating system 606 retrieves the multilevel object handle 534 and sends the client's content modification request along with the retrieved multilevel object handle 534 to the data storage node 208.1 to carry out the request. Therefore, any modification to the data associated with the "mbox" file, such as adding or deleting content from the data, will be carried out in the data storage node 208.1-208.N, where the "mbox" file's data is stored in, without any modification to the file system 608 or the associated inode files stored in the namespace storage node 602. On the other hand, when a file/directory is deleted or created in the file system 608, inode files associated with the file/directory are accordingly deleted or created in the file system 608. FIGS. 7A-7C discuss in detail how changes to metadata files (e.g., inode files) between a given time interval can be used to determine the files in the file system that have changed (i.e., created, deleted, modified, etc.) within the given time interval.

FIG. 6C illustrates an exemplary embodiment of file system 622 and its associated inode data, maintained by the storage operating system 606 of the InfiniteVol 600. In FIG. 6C, the file system 622 is used by the storage operating system 606 to logically organize and store the data associated with the file "mbox". As discussed earlier with reference to FIG. 6A, each data storage node may have its own storage operating system, file system and may be used to store the client's 204.1 data (e.g., "mbox" file's data). Here, when the client 204.1 wants to store the file "mbox" in the clustered storage server, a request is sent from the namespace storage node 602 to one of the data storage nodes 208.1-208.N (e.g., data storage nodes 208.1) to create a file and store the data of the "mbox" file within the newly created file. Further, the request from the namespace storage node 602 provides a file name for the newly created file in the data storage nodes 208.1.

In one instance, the file name for the newly created file could be the inode container number of the "mbox" file in the namespace storage node 602 (i.e., inode container number "60"). The storage operating system 606 creates a new file "60" in its file system 622 under pathname "./sys/vol1/" (where, in one instance, the pathname is determined by the storage operating system 606 internally), creates and associates a new inode file container number "7" 634 with the new file "60", and returns a file handle 534 to the namespace storage node 602. The file handle 534 includes a location ID 536 that incorporates the pathname "./sys/vol1/60" and the number of the data storage node 208.1.

The next time the client wants to modify the file "mbox" in the clustered storage server 202, the storage operating system 606 retrieves the file handle 534 stored in the stub file associated with the "mbox" file and sends a request to the data storage node 208.1 along with the retrieved file handle 534 and the modified data from the client 204.1. In the data storage node 208.1, the storage operating system 606 retrieves the location ID from the file handle 534, where the location ID includes the pathname "./sys/vol1/60" of the file to be modified. The storage operating system 606 accesses a root directory lookup table 624 of the file system 622 and identifies the inode container number of the directory "sys" as inode container number "8" 626.

The storage operating system 606 next retrieves the inode container number "8" 626 from the file system 622 and identifies the pointer "142" to the data block storing the data associated with directory "sys". In this case, given that "sys" is a directory, the data block associated with pointer "142" contains a lookup table mapping filenames to the inode numbers of the various files/directories under the directory "sys". The storage operating system 606 next searches the file system 622 for the inode container number of the sub-directory "vol1" (based on received pathname "./sys/vol1/60") in the lookup table 626 associated with data block of the directory "sys" and identifies the inode container number of the subdirectory "vol1" as inode container number "25" 628. The storage operating system 606 retrieves the inode container number "25" 628 and identifies the pointer "306" to the data block storing the data associated with subdirectory "vol1". In this case, given that "vol1" is a directory, the data block associated with pointer "306" contains a lookup table mapping filenames to the inode numbers of the various files/directories under the directory "vol1".

The storage operating system 606 next searches for the inode container number of the regular file "60" (based on client 204.1 provided pathname "./sys/vol1/60") in the lookup table 628 associated with data block of the directory "vol1" and identifies the inode container number of the file "60" as inode container number "7" 630. The storage operating system 606 retrieves the inode container number "7" 630 and identifies the pointer "418" to the data block storing the data associated with regular file "60". In this case, given that "60" is a regular file, the data block 634 associated with pointer "418" contains the data associated with the file "60". The file system 622 retrieves the content stored in the data block 634 and modifies the content in the data block as per the client's request. In the event additional data blocks are needed to store additional data from the client 204.1, the file system allocates new blocks to store the additional data and stores the pointers to the new blocks in the inode container number "7" 630.

Similarly, in the event some of the data blocks assigned to the file "60" are freed after some of the previously stored data are deleted by the client 204.1, the file system removes the references to the pointers to the freed blocks from the inode container number "7" 630. Once the data access request is completed, the data storage node 208.1 informs the namespace storage node 602 of the completion status, which can in turn inform the client 204.1 of the completion of data access request. Thus, the file system 602 and its associated inode files of the namespace storage node 602 remains unchanged from a modification of an existing file while the modification is reflected in the file system 622 and its associated inode files of the data storage node 622.

FIG. 7A is a block diagram that further illustrates how changes to metadata files (e.g., inode files) in a time interval can be used to identify files (e.g., in the clustered storage system) that have changed (i.e., created, deleted, modified, etc.) within the time interval. A software application 705 (in any of the clients 204.1 through 204.M of FIG. 1) sends a session request 701 to the InfiniteVol 600 (FIG. 2). The software application 705 is, for example, a third-party software application that is external to the InfiniteVol 600. In an embodiment of the technique introduced here, an application programming interface (API) 715 (included in or communicating with the namespace storage node 760 of the InfiniteVol 600) responds to the session request 701 with a session identifier 702 so that a session is established between the client 204.1 and the storage server 108. As known to those skilled in the art, a session is a series of interactions between two communication end points that occur during the span of a single connection. Typically, one end point requests a connection with another specified end point and if that end point replies and agrees to the connection request, then the end points take turns exchanging commands and data (i.e., "talking" to each other). The session begins when the connection is established at both ends and terminates when the connection is ended.

When a session is established between the client 204.1 and the InfiniteVol 600, the software application 705 can send a request 710 to the InfiniteVol 600 (FIG. 2). In an embodiment of the technique introduced here, the application programming interface (API) 715 in the InfiniteVol 600 receives the request 710. The request 710 is a request to determine the changes that have occurred to the files or/and directories, within a given time interval, in the file system 602 of InfiniteVol 600, which is presented to any of the clients 204.1 through 204.N. As discussed above with reference to FIGS. 6A-6C, the file system 602 of the namespace storage node 760 is visible to the client while the file system 626 of the data storage node 765 is not visible to the client.

For purposes of the discussion herein, a modification or change in a file system 602 can include adding, deleting, moving, renaming or modifying a file or directory in a file system 602 of the InfiniteVol 600. The request 710 includes a field 720 that indicates (identifies) the data subset (e.g., volume) that will be checked for modified files or/and directories in the file system. The request 710 also includes a field 725 that indicates the data subset (e.g., base persistent point-in-time image or snapshot) to be used as the base snapshot 796 (or base persistent point-in-time image (PPTI) 796) which is defined below. A snapshot is a specified subset of data that is maintained by the InfiniteVol 600. Typically, this specified subset of data is, for example, a volume of data.

Although snapshots are discussed herein as examples of the above-mentioned data subset, it is within the scope of embodiments of the technique introduced here that the data subset can be any suitable type of persistent point-in-time image (PPTI) which is a point-in-time representation of data (e.g., file system) that is stored on a storage device (e.g., disk). As discussed earlier, associated with each file in a dataset is a set of metadata for that file, such as a pointer to the file, the file size, the number of blocks included in the file, permissions, etc.

This set of metadata is stored in a unit of storage called a metadata container 785 (see FIG. 7C). One example of a metadata container 785 is an "inode" which is shown as example inode 785 in FIG. 7C.

Each file in a dataset has a separate metadata container (e.g., inode) which contains the file's metadata. The main purpose of an inode 785 is to store metadata about a particular data file, including a pointer 786 (FIG. 7A) to the tree structure of the data file, the size 787 (e.g., in kilobytes) of the data file, the number 788 of data blocks in the data file, the link count 789 (number of references to that data file in the dataset), permissions 795 that are associated with the data file, creation time/date 791 of the data file, and access time/date 792 to the data file. An inode 785 may also include other metadata that are not mentioned herein. Whenever an actual data block in a file is modified, added, deleted, or renamed, at least some of the metadata in that file's inode 785 will necessarily change. Therefore, by comparing the contents of an inode 785 in one PPTI (e.g., snapshot) with the contents of the corresponding inode in another PPTI (e.g., snapshot), it is possible to determine whether the associated file changed from one PPTI to the other PPTI. If the contents of the two corresponding inodes are different, then the file has changed. If the inode contents are identical, then the file has not changed.

As discussed above in reference to FIGS. 6A-6C, in the InfiniteVol 600, the data storage nodes 208.1-208.N and the namespace storage node 602 each maintain an independent file system and associated inode files. In the InfiniteVol 600, the namespace storage node 602 maintains the files and directories, in the file system 608 (which includes the associated inode files), which are visible to the clients 204.1-204.M while the data associated with the files and directories in the file system 608 are stored in data storage nodes 208.1-208.N, where each data storage nodes 208.1-208.N maintains an independent file system (e.g., file system 622) and associated inode files. Therefore, any modification to the data associated with the files in the file system 608, such as adding or deleting content from the stored data, will be carried out in the data storage node 208.1-208.N, where at least some of the metadata in the stored data's inode 785 will necessarily change in the data storage node 208.1-208.N. Such modification of the data associated with the files in the file system 608 will not change the metadata associated with the files in the namespace storage node 602.

On the other hand, when a file is deleted or created in the file system 608, inode files associated with the file are accordingly deleted or created in the file system 608. Therefore, by comparing the contents of an inode 785 in one PPTI (e.g., snapshot) of the namespace storage node 602 with the contents of the corresponding inode in another PPTI (e.g., snapshot) of the namespace storage node 602, it is possible to determine files that have been newly created, deleted, renamed, or moved within a given time interval. Further, by comparing the contents of an inode 785 in one PPTI (e.g., snapshot) of a data storage node 208.1-208.N with the contents of the corresponding inode in another PPTI (e.g., snapshot) of the data storage node 208.1-208.N, it is possible to determine files that have been modified within a given time interval. Here, given that the names of modified files in the data storage nodes 208.1-208.N are different from the corresponding names of the modified files in the file system 608 of the namespace storage node 602 (see discussion relating to FIG. 6C), a snapshot of the namespace storage node 602 corresponding to snapshot of the data storage node 208.1-208.N is used to generate filenames and identifiers corresponding to the modified files. FIG. 8 explains in detail how file names corresponding to inodes that have changed are determined in the InfiniteVol 600.

FIG. 7A illustrates how changes to metadata files (e.g., inode files) in a time interval is used to identify files that have changed (i.e., created, deleted, modified, etc.) within the time interval. Here, the base snapshot 730 (or base (first) PPTI 730) of the namespace storage node 760 is a prior PPTI (e.g., snapshot) of a dataset (including the file system 608 and associated inode files) at a given start time (first time value) T1, and the difference snapshot 735 (or difference (second) PPTI 735) of the namespace storage node 760 is a subsequent PPTI (e.g., snapshot) of the same dataset at a later time (second time value) T2. Further, the base snapshot 796 (or base (first) PPTI 796) of the data storage node 765 is a prior PPTI (e.g., snapshot) of a dataset (including the file system 622 and associated inode files) at a given start time (first time value) T1, and the difference snapshot 798 (or difference (second) PPTI 798) of the data storage node 765 is a subsequent PPTI (e.g., snapshot) of the same dataset at a later time (second time value) T2.

As an example, time T2 may be the latest or current time that has occurred when the request 710 is received by the API 715. Therefore, base snapshot 730 can be a data subset (e.g., a volume) in the file system 608 at a given start time T1 and the difference snapshot 735 can be the same data subset (e.g., the same volume) at a given end time T2. Therefore, the user can indicate (typically, via software application 705) a time T1 in the field 725 and this time T1 will correspond to an appropriate base snapshot. The user can optionally indicate (typically, via software application 705) a time T2 in field 742 of the request 710, and this time T2 will correspond to an appropriate difference snapshot 735. Alternatively, the difference snapshot 735 will correspond to the snapshot of the given dataset at the current time when the request 710 is received by the API 715, and in this case, the field 742 in the request 710 is not used or does not include a value. Similar to the base snapshot 330 and difference snapshot 335 of the namespace storage node 360, the base snapshot 796 and difference snapshot 798 of the data storage node 765 corresponds to the start time T1 and end time T2.

For each request 710 from a software application 705, the API 715 will forward each request 715 to a comparison unit included in each of the storage nodes 208.1 through 208.N (FIG. 2). In an embodiment of the technique introduced here, shown in FIG. 7, the API 715 will forward each request 715 to the comparison unit 755 of the namespace storage node 760 and to the comparison unit 795 of the data storage node 765. Based on the contents in the fields 720, 725, 740, and 742 in the requests 710, each comparison unit 755 determines the metadata containers (e.g., inodes) of files and/or directories that have changed between the time interval from T1 to T2 in the namespace storage node 760. Given that the InfiniteVol 600 stores the data associated with the files in the data storage node 765 while maintaining the namespace associated with the files in the file system 608 of the namespace storage node 760, a comparison of metadata in the base 730 and difference 735 snapshot of the namespace storage node 760 would identify any newly created, deleted, renamed or moved files or directories in the InfiniteVol 600. However, as discussed above, any modifications to the data of the files or directories will not be identifiable based on the comparison of metadata in the base 730 and difference 735 snapshot of the namespace storage node 760. Any modification to the data associated with the files in the file system 608 of the namespace storage node 760 will be determined by a comparison of metadata in the base 796 and difference 798 snapshot stored within the data storage node 765.

In the namespace storage node 760, the comparison unit 755 compares the metadata containers (e.g., inodes) in the base snapshot 730 of the namespace storage node 760 with the same metadata containers (e.g., inodes) in the difference snapshot 735 of the namespace storage node 760, in order to determine which metadata containers of the namespace storage node 760 have that changed from the time T1 to time T2. In the namespace storage node 760, a change to a metadata container corresponds to a file or directory that has been created, deleted, renamed or moved in the file system 608 between time intervals T1 and T2. For each metadata container (e.g., inode) corresponding to a file or directory that has been created, deleted, renamed or moved in the file system 608 between time intervals T1 and T2, the comparison unit 755 determines the name of the newly created, deleted, renamed or moved file or directory in the file system 608 and forwards the determined name to the API 715. FIG. 8 illustrates in detail how file names corresponding to inodes that have changed are determined in the InfiniteVol 600.

In another embodiment, the comparison unit 755 will assign and transmit an identifier 770 for each metadata container (e.g., inode) corresponding to a file or directory that has been created, deleted, renamed or moved in the file system 608 between time intervals T1 and T2. As an example, an identifier can be bit values that are unique for each metadata container. Also, each changed metadata container (that are listed in the listing 780) will list a corresponding metadata container number (e.g., inode number) that identifies the directory or file for that corresponds to the changed metadata container. Additional details of the comparison between the snapshots (data subsets) 730 and 735 is discussed in an example below with reference to FIG. 7B. An example of a suitable comparison unit 755 is disclosed in commonly-assigned U.S. patent application Ser. No. 11/093,074.

Similar to the functions of the comparison unit 755, the comparison unit 795 of the data storage node 765 compares the metadata containers (e.g., inodes) in the base snapshot 796 of the data storage node 765 with the same metadata containers (e.g., inodes) in the difference snapshot 798 of the data storage node 760, in order to determine which metadata containers of the data storage node 765 that have changed from the time T1 to time T2. In the data storage node 765, a change to a metadata container corresponds to a file that has been created, deleted, or modified in the file system 608 between time intervals T1 and T2. Given that the comparison unit 760 identified all the files that have been created or deleted in the file system 608, the comparison unit 795 filters out the metadata containers corresponding to the files that have been created or deleted and processes only the metadata containers corresponding to the files that have been modified between time intervals T1 and T2. For each metadata container (e.g., inode) in the data storage node 765 that corresponds to a file that has been modified between time intervals T1 and T2, the comparison unit 795 determines the filename of the modified file as referenced in the file system 608 and forwards the determined name to the API 715.

Here, given that the names of modified files in the data storage node 765 are different from the corresponding names of the modified files in the file system 608 of the namespace storage node 760 (see discussion relating to FIG. 6C), the comparison unit 765 utilizes the base 730 and difference 735 snapshots of the namespace storage node 760 that correspond to the base 396 and difference 398 snapshot of the data storage node 765 to generate filenames and identifiers for the modified files that correspond to the filenames and identifiers for the modified files in the file system 608. The comparison unit 795 includes a namespace snapshot sync unit 793 that copies the appropriate namespace storage node 760 snapshots for time intervals T1 and T2 before the comparison unit 765 performs the filename and identifier generation. The comparison unit 765 cross-references the file names of the modified files in the file system 622 of the data storage node 765 with that of the file names of the modified files in the file system 608 of the namespace storage node 760 to generate filenames and identifiers for the modified files that correspond to the filenames and identifiers for the modified files in the file system 608. FIG. 8 explains in detail how file names corresponding to inodes that have changed are determined in the InfiniteVol 600.

In an embodiment, the request 710 may include a maxdiff value (threshold amount) 740 which indicates the maximum number of files names or directory names or identifiers of changed metadata containers (e.g., inodes) that will be contained in a single response 745 from the API 715. For example, if the maxdiff value 740 is set at 50 (where maxdiff is typically set by a user via software application 705), then each response 745 from the API 715 will indicate up to 50 identifiers 770, 772 of changed file/directory pathnames or metadata containers that correspond to files and/or directories that have changed in a given data subset (e.g., volume) between time T1 and time T2.

A response 745 is sent from the API 715 to the software application 705, until all file/directory pathnames or identifiers 770, 772 of metadata containers of changed files/changed directories are reported in response to the previous request 710. When all file/directory pathnames or identifiers 770, 772 of metadata containers of changed files/changed directories have been reported via the response(s) 745, the software application 705 can typically send a request 750 to end the session between the host 110 and the storage server 115.

The listing 780 of all file/directory pathnames or metadata containers of changed files/directories is useful in, for example, creating a catalog of information of a file system of the storage server 115. The listing 780 may include information such as, for example, a listing of file name changes or directory name changes (where these name changes are determined by the metadata container comparison by the comparison unit 755), metadata container numbers (which identifies a file or directory that corresponds to the metadata container in file system 608 of the namespace storage node 602), access time/date, creation time/date, modification time/date, and/or changes in file size. Therefore, the identifier 770 can also include these other information.

As one example of a benefit that is provided by the generation of the listings 780, the listings 780 advantageously permit a faster update of a standard file system index 781 which can be in a memory of a host 110 or can be in a storage space (e.g., disk) that is accessible to the host 110. As known to those skilled in the art, generally, a file system index may be any data structure that organizes a collection of metadata according to some aspect or attribute and permits the host 110 to query the content of a file system based on the aspect or attribute that is indexed in the index 781. Various software applications for creating and updating a file system index are commercially available from various vendors (e.g., Microsoft Corporation). As an example, an index 781 may list a name of all files in a file system or can sort the file system content based on associated user, content creation or modification time, or other attributes. Since the list 780 indicates only the files or directories that have been changed in a file system, a user can use a standard software application for creating/updating a file system index in order to update the attributes contents in the index 781 based on the listing 780. Therefore, a faster update of the index 781 is possible because only the attributes that are identified in the list 780 are updated by a user in corresponding attributes entries in the index 781. As mentioned above, a user can use any commercially available suitable software application for updating the file system index 781.

The API 715 can implement other functionalities such as, for example, the functionalities in the Zephyr API which is a proprietary API that is provided by NetApp, Inc. The API 715 typically includes software components and operates with standard hardware components in order to perform the various functions that are discussed herein. The software components in the API 715 are represented by the software module 716 which can be programmed by use of suitable known software programming languages (e.g., C, C++, or other languages) and by use of known programming techniques.

The transmissions of requests and responses between the software application 705 and API 715 can use, for example, XML (extensible markup language). As known to those skilled in the art, XML is commonly used on the Internet to create simple methods for the exchange of data among diverse clients or hosts. However, different transport mechanisms that are known to those skilled in the art can alternatively be used for the transmissions of the requests 710 and responses 745. The functions calls in a transport mechanism may require modification depending on, for example, if transmissions are being sent via a socket, fibre channel, SCSI, or via TCP/IP.

As shown in the example of FIG. 7B, the structure of a PPTI (i.e., data subset) includes a metadata container file which has information about all metadata containers (e.g., inodes) for a given dataset. As an example, the base snapshot 796 of the data storage node 765 has a corresponding metadata container file 701*a* which stores information about all metadata containers (e.g. inodes) for a given data subset such as, e.g., a volume, along with the state of the data subset taken at time T1. The metadata container file 701*a* has a hierarchical structure with a root node 702*a*. The root node 702*a* has fields 705 that each contains pointers to another node in the metadata container file 701*a*. This other node can be an indirect block (not shown in FIG. 7B) which points to another node, or a direct block 703*a* and a direct block 704*a* as shown in the example of FIG. 7B. The direct blocks 703*a* and 704*a* includes metadata containers of files for the given data subset. For example, the metadata container 707*a* includes a pointer to a corresponding data file 706*a* which has the data of a file that corresponds to the metadata container 707*a*. The metadata container 707*a* also includes metadata that relates to the data file 706*a*. The data file 706*a* is also in a hierarchical structure and includes a root node 708 with fields 709 that contain pointers to direct data blocks 710. The direct data blocks 710 contain a portion of the actual data of the file that corresponds to the metadata container 707*a*.

The difference snapshot 798 has a corresponding metadata container file 701*b* which stores information about all metadata containers for the same given data subset, with the state of the data subset taken at time T2. Therefore, root node 702*b* is the root node 702*a* at time T2. The comparison unit 795 compares each metadata container in the metadata container file 701*a* with the same metadata container in the metadata container file 701*b*, in order to determine if a file or directory corresponding to the metadata container has changed (i.e., modified, added, deleted, or accessed) between the time T1 and time T2. For example, the comparison unit 795 compares the content in a particular field in the metadata container 707*a* at time T1 with the content in the same particular field in the same metadata container (shown as metadata container 707*b*) at time T2. If the contents in the field have changed between time T1 and time T2, then the metadata container is a changed metadata container. The fields in a metadata container would indicate, for example, a data file pointer, file size, number of blocks for the file, link count, permissions, creation time/date, and access time/date.

The comparison unit 795 compares the fields with the data file pointer, file size, number of blocks for the file, link count, permissions, creation time/date, and access time/date in the metadata container 707*a* with corresponding fields in the metadata container 707*b*, in order to determine if a metadata container has been modified between time T1 and time T2. These fields were previously discussed above with reference to FIG. 7C. Since a metadata container file is sequentially accessed by the comparison unit 795, the speed of determining the changed metadata containers is increased. Note that a third party software application 705 (which is external to a storage server) is not able to access and not able to read the metadata container files in the file system. Furthermore, the API 715 and the comparison unit 795 advantageously eliminates the use of the above-discussed previous techniques where an external software application 705 is required to perform multiple reads in a file system to determine the changes in the file system.

For a directory metadata container (e.g., directory inode), the comparison unit 795 can read the directory metadata container blocks in parallel for faster speed. The contents of a directory metadata container blocks are the names and references for the metadata containers in that directory. The comparison unit 795 can simultaneously read two (2) or more directory metadata container blocks and compare them to corresponding directory metadata container blocks at time T2 in order to determine changes in the directories in the file system. This metadata container comparison process is further described in, for example, the above cited U.S. application Ser. No. 11/093,074.

Similar to the comparison unit 795, the comparison unit 755 of the namespace storage node 760 compares the metadata in the metadata container files of the base 730 and difference 735 snapshot in order to determine if a file or directory corresponding to the metadata container has changed (i.e., added, deleted, or accessed) between the time T1 and time T2. In addition, as discussed earlier in reference to FIG. 6C and FIG. 7A, the comparison unit 755 of the data storage node 765 filters the metadata container files that have changed between the time T1 and time T2 and processes only those metadata container files that correspond to a modified file or directory.

Another embodiment of the technique introduced here can have the optional feature of providing access security by the API 715, so that only authorized requests 710 are processed by the API 715. In this case of using authorized requests 710, as an example, the session request 701 would include a password field that would be authenticated by the API 715 before a session is established between the host 110 and storage server 115. Another embodiment of the technique introduced here can have the optional feature where the API 715 can send a progress indicator to the application software 705 to indicate the progress of the above-discussed metadata container comparison process.

Figure 8A:
FIGS. 8A-8B illustrates metafiles that can be used by the comparison units to determine the names of files and directories that correspond to metadata container files (e.g., inodes) that have changed in the expandable storage volume within a given time interval.
Figure 8B:

FIGS. 8A-8B illustrates metafiles used by the comparison units 755, 795 to determine the names of files and directories that correspond to metadata container files (e.g inodes) that have changed in the InfiniteVol 600 within a given time interval. FIG. 8A illustrates a metafile 802 created and maintained by the storage operating system 606 as part of the file system 608 in the namespace storage node 602. The metafile 802 contains a mapping between the inode container number and the name of the file or directory associated with the inode container number (see discussion with reference to FIG. 6B). In the namespace storage node 602, the storage operating system 606 creates an entry with inode container number to file or directory name mapping in the metafile 802 when a file or directory is created in the file system 608. Similarly, the storage operating system 606 deletes a mapping entry in the metafile 802 when a file or directory associated with the entry is deleted from the file system 608. For example, the file "mbox" in file system 608 was associated with an inode file with container number "60" 620 when the file "mbox" was created and stored in the InfiniteVol 600. The storage operating system 606 created an entry for the file "mbox" in the metafile 802 with an entry mapping the file name "mbox" to inode container number "60" 620.

In the namespace storage node 602, the comparison unit 755 utilizes the metafile 802 to determine the name of the file or directory associated with the changed inode file (i.e., metadata container file) using the inode container number of the changed inode file. Further, in one embodiment, the comparison unit 755 determines the full pathnames of all the files or directories for which differences were recorded. By "full pathname", what is meant is the filename and the names of any directories and subdirectories in which the file is located, from the root of the volume to the file itself, in human-readable form. For example, assume a file named "China_exports" is stored in a subdirectory called "world_trade", which is stored in a directory called "economics" in a storage volume named "vol1"; in that case, the full pathname of the file would be ./vol1/economics/world_trade/China_exports. The full pathnames can be determined simply by "walking" the snapshot trees starting from the root nodes, and recording the various directories and subdirectories along the path to each changed file. A technique for quickly and efficiently walking a hierarchical data set to identify full pathnames of changed files and directories, which is suitable for this purpose, is described in co-pending U.S. patent application Ser. No. 10/954,381 of S. Manley et al., filed on the Sep. 29, 2004 and entitled, "Method and Apparatus for Generating User-Level Difference Information About Two Data Sets," ("the Manley technique"), which is incorporated herein by reference.

In the data storage nodes 208.1-208.N, the comparison units perform a similar function to the comparison unit 755 of the namespace storage node 602 to determine the names of files and directories that correspond to metadata container files (e.g., inodes) that have been modified in the InfiniteVol 600. FIG. 8B illustrates a metafile 804 created and maintained by the storage operating system 606 as part of the file system 622 in the data storage node 208.1. As discussed with reference to FIG. 6C, when the data associated with file "mbox" is stored in the data storage node 208.1 under file name "60" (where "60" refers to the inode number associated with file "mbox" in file system 608), the storage operating system 606 created an inode file with container number "7" 634 and associated with the file name "60". Further, the storage operating system 606 created an entry with inode contained number "7" 634 mapping to file name "60" in the metafile 804. In the data storage node 208.1, the comparison unit 795, similar to the comparison unit 755, utilizes the metafile 802 to determine the name of the file or directory associated with the changed inode file (i.e. metadata container file) using the inode container number of the changed inode file.

However, unlike the namespace storage node 602, in the data storage node 208.1, the name of the file or directory associated with the changed inode file corresponds to an internal name that is not visible to the clients 204.1-204.M making the request. For example, the data associated with file "mbox" in the data storage node 208.1 is stored under the name "60". So, when the name of the file associated with a modified inode file with container number "7" 634 is looked up in the metafile 804, the filename associated with a modified inode file shows up as "60", which is an internal name for the data associated with the file "mbox". In one embodiment, the comparison units of the data storage nodes perform an additional lookup utilizing the internal file name (e.g., filename "60"). The comparison unit 795 utilizes the internal file name (e.g., filename "60") and the metafile 802 associated with the namespace storage node 602 to look up the file or directory name associated with the inode container number "60" (where the internal file name "60" is now used as the inode container number). This is possible because when the data associated with file "mbox" was stored in data storage node 208.1, the storage operating system 606 deliberately provided the inode container number of the file (here, container number 60) whose data was stored in the data storage node 208.1, enabling the data storage node 208.1 to do the reverse lookup in metafile 802 to identify the filename "mbox" associated with the modified file "60".

In metafile 802, the inode container "60" corresponds to the filename "mbox". Once the filename and the associated inode container number "60" is available, the comparison unit 795, similar to the comparison unit 755, determines the full pathnames of all the files or directories for which differences were recorded. The full pathnames can be determined simply by "walking" the namespace snapshot trees 730, 735 (that were previously copied locally by the namespace snapshot sync unit 793) starting from the root nodes, and recording the various directories and subdirectories along the path to each changed file.

Figure 9:
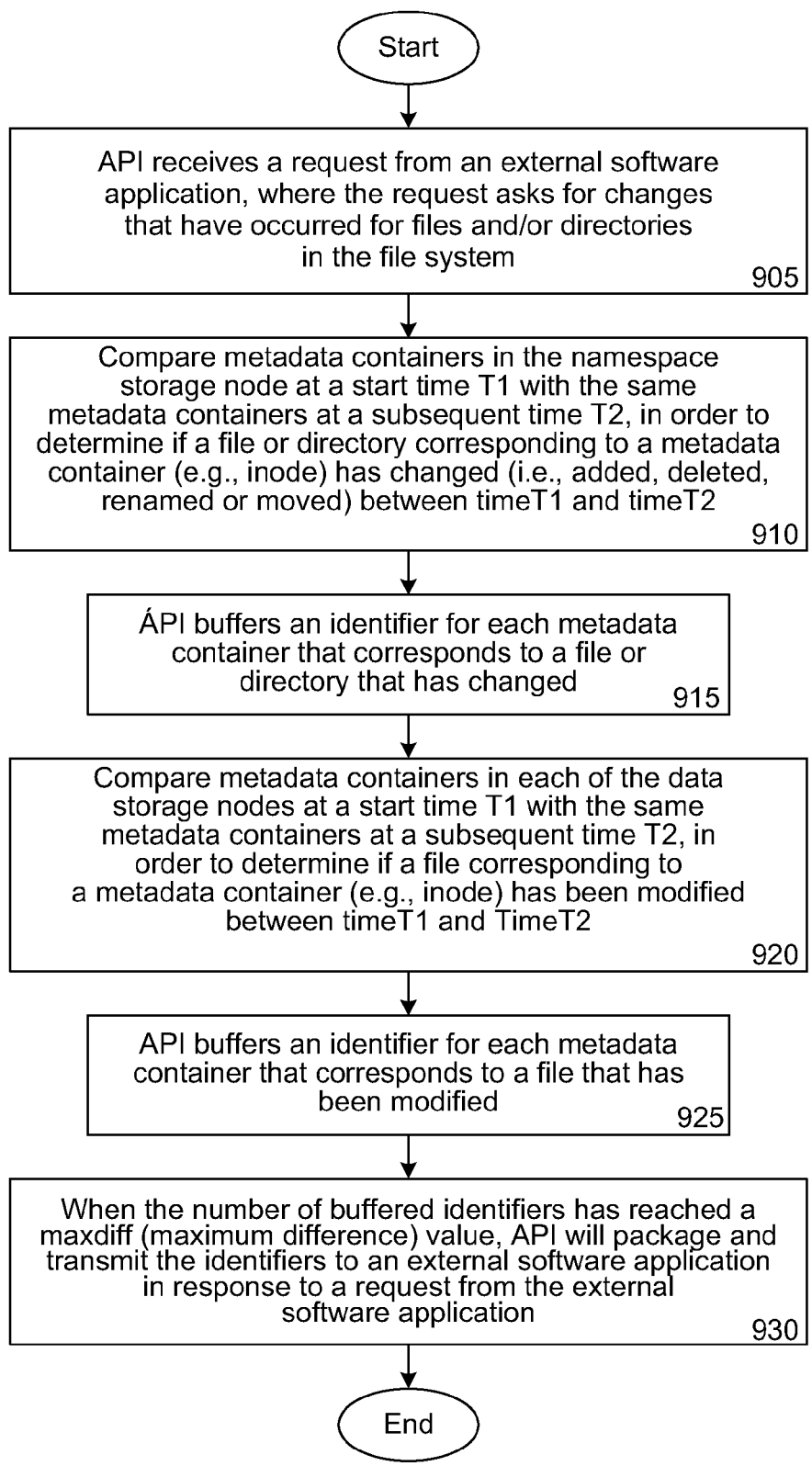
FIG. 9 is a flow chart illustrating how changes to metadata files (e.g., inode files) in the expandable storage volume can be used to determine files and directories that have changed.

FIG. 9 is a method 900 in accordance with an embodiment of the technique introduced here. In block 905, the API 715 receives a request 710 from an external software application 705, where the request 701 asks for changes that have occurred for files and/or directories in the file system of the Infinite Vol 600. In block 910, the comparison unit 755 in the namespace storage node 760 compares metadata containers (e.g., inodes) in the file system 608 at a start time T1 with the same corresponding metadata container at a subsequent time T2, in order to determine if a file or directory corresponding to a metadata container in the file system has changed (i.e., added, deleted, renamed or moved) between time T1 and time T2. In block 915, API 715 buffers an identifier 770 (e.g., filename with its full pathname) for each metadata container that corresponds to a file or directory that has changed.

In block 920, the comparison unit 795 in the data storage node 765 compares metadata containers (e.g., inodes) in the file system 622 at a start time T1 with the same corresponding metadata container at a subsequent time T2, in order to determine if a file corresponding to a metadata container in the file system has been modified between time T1 and time T2. In block 925, API 715 buffers an identifier 772 (e.g., filename with its full pathname) for each metadata container that corresponds to a file that has been modified.

In block 930, when the number of buffered identifiers 770, 772 (buffered in buffer 775) has reached a maxdiff value (maximum different value), the API 715 will package and transmit the identifiers 770 in a response 745 to the external software application request 710. When the API 755 stops receiving any identifier 770 from the comparison unit 755, the API 755 will package and transmit any remaining buffered identifiers 770 in the buffer 775 via the response 745 that is transmitted to the external software application 705.

It is also within the scope of an embodiment of the technique introduced here to implement a program or code that can be stored in a machine-readable medium to permit a computer to perform any of the methods described above. The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc. Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Thus, an apparatus and method for presenting differences in a file system of a clustered storage system have been described. Note that references throughout this specification to "one embodiment" or "an embodiment" mean that a particular feature, structure or characteristic described in connection with the embodiment is included in at least one embodiment of the technique introduced here. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method comprising:
receiving a client request to provide identifiers for one or more data objects included in a file system of a cluster storage system that have changed within a given time interval;
utilizing a first snapshot and a second snapshot of a namespace storage node captured at a start time and a end time of the given time interval, respectively, in conjunction with a first snapshot and a second snapshot of a data storage node captured at the start time and the end time of the given time interval, respectively, to determine the identifiers corresponding to the data objects of the file system that have changed within the given time interval, the namespace storage node and the data storage node being associated with the file system, the namespace storage node maintaining a namespace of the file system of the cluster storage system, the data storage node storing the data objects of the file system using a second file system different from that of the file system, the data storage node and the namespace storage node being distinct entities; and
providing the determined identifiers to the requesting client.

2. The method of claim 1, wherein said determining identifiers comprises:
identifying a first metadata container associated with the namespace storage node that has changed within the given time interval by comparing records of the namespace metadata container included in the first snapshot and the second snapshot;
buffering a first identifier that corresponds to the changed first metadata container in the namespace storage node;
identifying a second metadata container associated with the data storage node that has been modified within the given time interval by comparing records of the second metadata container included in the first snapshot and the second snapshot; and
buffering a second identifier that corresponds to the modified second metadata container in the data storage node, wherein the buffered second identifier is identified based on a namespace directory, the namespace directory including a mapping between the second metadata container and the second identifier, wherein a particular buffered identifier associated with the namespace storage node and the data storage node is the determined identifier corresponding to a particular data object included in the file system that has changed within the given time interval.

3. The method of claim 2, wherein comparing of records of a particular metadata container, included in the first snapshot and the second snapshot, to determine a change in the particular metadata container includes performing a comparison of nonpointer fields of the first record of the particular metadata container and the second record of the particular metadata container.

4. The method of claim 2, wherein comparing of records of a particular metadata container, included in the first and second snapshots, to determine a modification in the particular metadata container includes performing a comparison of pointer fields of the first record of the particular metadata container and the second record of the particular metadata container.

5. The method of claim 3, wherein the nonpointer fields of the particular metadata container include one or more of: (1) creation time of the particular metadata container; (2) access time of the particular metadata container; or (3) link count of the particular metadata container.

6. The method of claim 3, wherein the changed metadata container is associated with a file or a directory that has changed in the file system within the given time interval.

7. The method of claim 6, wherein the file or directory that has changed in the file system within the given time interval includes a file or directory that has been added, deleted, renamed, or moved within the given time interval.

8. The method of claim 7, wherein the particular buffered identifier includes a full pathname of a particular file or directory associated with a particular changed metadata container.

9. The method of claim 4, wherein the pointer fields of the particular metadata container include one or more of: (1) direct data block pointers of the particular metadata container; or (2) indirect data block pointers of the particular metadata container.

10. The method of claim 2, wherein the modified metadata container is associated with a file or a directory that has been modified in the file system within the given time interval.

11. The method of claim 10, wherein the file or directory that has been modified in the file system within the time interval includes a file or directory that has been modified within the given time interval.

12. The method of claim 11, wherein the particular buffered identifier includes a full pathname of a particular file or directory associated with a particular modified metadata container.

13. A method comprising:
  receiving a client request to provide one or more identifiers for data objects included in a file system of a cluster storage system that have changed within a given time interval;
  retrieving a first snapshot of the file system captured at a start of the given time interval, the first snapshot including a snapshot of a data storage node and a namespace storage node at the start of the given time interval, the data storage node and the namespace storage node being associated with the clustered storage system, the file system being included within the clustered storage system, the namespace storage node maintaining a namespace of the file system of the cluster storage system, the data storage node storing the data objects of the file system using a second file system different from that of the file system, the data storage node and the namespace storage node being distinct entities;
  retrieving a second snapshot of the file system captured at an end of the given time interval, the second snapshot including a snapshot of the data storage node and the namespace storage node at the end of the given time interval;
  identifying a first metadata container associated with the namespace storage node that has changed within the given time interval by comparing records of a namespace metadata container included in the first and second snapshots;
  buffering a first identifier that corresponds to the changed first metadata container in the namespace storage node;
  identifying a second metadata container associated with the data storage node that has been modified within the given time interval by comparing records of the second metadata container included in the first and second snapshots; and
  buffering a second identifier that corresponds to the modified second metadata container in the data storage node, the buffered identifier determined based on a namespace directory, the namespace directory including a mapping between the second metadata container and the identifier, wherein each buffered identifier associated with the namespace storage node and the data storage node are indicative of changes in the file system within the given time interval; and
  providing the buffered identifiers to the requesting client.

14. The method of claim 13, wherein comparing of records of a particular metadata container, included in the first and second snapshots, to determine a change in the particular metadata container includes performing a comparison of non-pointer fields of the first record of the particular metadata container and the second record of the particular metadata container.

15. The method of claim 14, wherein the file or directory that has changed in the file system within the given time interval includes a file or directory that has been added, deleted, renamed, or moved within the given time interval.

16. The method of claim 13, wherein comparing of records of a particular metadata container, included in the first and second snapshots, to determine a modification in the particular metadata container includes performing a comparison of pointer fields of the first record of the particular metadata container and the second record of the particular metadata container.

17. The method of claim 13, wherein the modified metadata container is associated with a file or a directory that has been modified in the file system within the given time interval.

18. A method of presenting differences in a file system of a clustered storage system, the method comprising:
  receiving a request from a host, wherein the request is for an identification of changes in the file system within a given time interval;
  retrieving a first snapshot of the file system captured at a start of the given time interval, the first snapshot including a snapshot of a data storage node and a namespace storage node at the start of the given time interval, the data storage node and the namespace storage node being associated with the clustered storage system, the namespace storage node maintaining a namespace of the file system of the cluster storage system, the data storage node storing the data objects of the file system using a second file system different from that of the file system, the data storage node and the namespace storage node being distinct entities;
  retrieving a second snapshot of the file system captured at an end of the given time interval, the second snapshot including a snapshot of the data storage node and the namespace storage node at the end of the given time interval;
  utilizing the first and the second snapshot of the namespace storage node in conjunction with the first and the second snapshot of the data storage node to identify one or more changed metadata containers within the given time interval;
  for each of the one or more changed metadata container, buffering an identifier that corresponds to the changed metadata container, wherein the buffered identifiers are indicative of changes in the file system within the given time interval; and
  packaging and transmitting the buffered identifiers to the host, wherein the buffered identifiers are readable on the host.

19. The method of claim 18, wherein the changed metadata container is associated with a file or a directory that has changed in the file system within the given time interval.

20. A network storage server system comprising:
  a processor;
  a network interface through which to communicate with a plurality of storage clients over a network;
  a storage interface through which to communicate with a nonvolatile mass storage subsystem; and
  a memory storing code which, when executed by the processor, causes the network storage server system to perform a plurality of operations, including:
    retrieving a first snapshot of a file system captured at a start of the given time interval, the first snapshot including a snapshot of a data storage node and a namespace storage node at the start of the given time interval, the data storage node and the namespace storage node being associated with the clustered storage system, the file system being associated with a clustered storage system, the namespace storage node maintaining a namespace of the file system of the cluster storage system, the data storage node storing the data objects of the file system using a second file system different from that of the file system, the data storage node and the namespace storage node being distinct entities; and retrieving a second snapshot of the file system captured at an end of the given time interval, the second snapshot including a snapshot of the data storage node and the namespace storage node at the end of the given time interval;

utilizing the first and the second snapshot of the namespace storage node in conjunction with the first and the second snapshot of the data storage node to identify changes in the cluster-storage based file system within the given time interval; and providing the identified changes to the requesting client.

21. The storage server of claim 20, wherein the changed metadata container is associated with a file or a directory that has changed in the file system within the given time interval.

22. The storage server of claim 21, wherein the file or directory that has changed in the file system within the time interval includes a file or directory that has been added, deleted, modified, moved or renamed within the given time interval.

23. The storage server of claim 20, wherein identifying changes in the file system of the clustered storage system within the given time interval by utilizing snapshots of the namespace storage node and the data storage node further comprises:

identifying a first metadata container associated with the namespace storage node that has changed within the given time interval by comparing records of the namespace metadata container included in the first and second snapshots;

buffering a first identifier that corresponds to the changed first metadata container in the namespace storage node;

identifying a second metadata container associated with the data storage node that has been modified within the given time interval by comparing records of the second metadata container included in the first and second snapshots; and buffering a second identifier that corresponds to the modified second metadata container in the data storage node, the buffered identifier determined based on a namespace directory, the namespace directory including a mapping between the second metadata container and the second identifier, wherein buffered identifiers associated with the namespace storage node and the data storage node are indicative of changes in the file system within the given time interval.

24. The storage server of claim 23, wherein comparing of records of a particular metadata container, included in the first and second snapshots, to determine a change in the particular metadata container includes performing a comparison of nonpointer fields of the first record of the particular metadata container and the second record of the particular metadata container.

25. The storage server of claim 24, wherein the nonpointer fields of the particular metadata container includes one or more of: (1) creation time of the particular metadata container; (2) access time of the particular metadata container; or (3) link count of the particular metadata container.

26. The storage server of claim 24, wherein the file or directory that has changed in the file system within the given time interval includes a file or directory that has been added, deleted, renamed, or moved within the given time interval.

27. The storage server of claim 23, wherein comparing of records of a particular metadata container, included in the first and second snapshots, to determine a modification in the particular metadata container includes performing a comparison of pointer fields of the first record of the particular metadata container and the second record of the particular metadata container.

28. The storage server of claim 27, wherein the pointer fields of the particular metadata container includes one or more of: (1) direct data block pointers of the particular metadata container; or (2) indirect data block pointers of the particular metadata container.

29. The storage server of claim 23, wherein the modified metadata container is associated with a file or a directory that has been modified in the file system within the given time interval.

30. The storage server of claim 29, wherein the file or directory that has been modified in the file system within the time interval includes a file or directory that has been modified within the given time interval.

* * * * *